US006850511B2

(12) United States Patent
Kats et al.

(10) Patent No.: US 6,850,511 B2
(45) Date of Patent: Feb. 1, 2005

(54) TIMELY ORGANIZED AD HOC NETWORK AND PROTOCOL FOR TIMELY ORGANIZED AD HOC NETWORK

(75) Inventors: Marat G. Kats, Rockaway Beach, NY (US); Helena Zelmanovich, Deer Park, NY (US); Igor Tchibirev, Glen Cove, NY (US); Yuriy Izvarin, Upper Brookville, NY (US)

(73) Assignee: Intech 21, Inc., Glen Cove, NY (US)

( * ) Notice: Subject to any disclaimer, the term of this patent is extended or adjusted under 35 U.S.C. 154(b) by 100 days.

(21) Appl. No.: 10/271,709

(22) Filed: Oct. 15, 2002

(65) Prior Publication Data

US 2004/0071107 A1 Apr. 15, 2004

(51) Int. Cl.[7] .................................................. H04Q 7/24
(52) U.S. Cl. ........................ 370/338; 370/349; 709/338
(58) Field of Search ................................ 709/230, 238, 709/220, 222; 370/328, 329, 330, 336, 337, 338, 312, 347, 348, 349

(56) References Cited

U.S. PATENT DOCUMENTS

| | | | | |
|---|---|---|---|---|
| 5,717,689 A | * | 2/1998 | Ayanoglu | 370/349 |
| 6,134,587 A | * | 10/2000 | Okanoue | 709/222 |
| 6,307,843 B1 | * | 10/2001 | Okanoue | 370/312 |
| 6,577,613 B1 | * | 6/2003 | Ramanathan | 370/337 |
| 6,628,620 B1 | * | 9/2003 | Cain | 370/248 |

OTHER PUBLICATIONS

Murthy et al., "An Efficient Routing Protocol for Wireless Networks," Baltzer Journals, University of California.
Pegon et al., "Simulation Framework for a Mobile Ad–Hoc Network," Wireless Communications Technology Group, National Institute of Standards and Technology.
Aguayo, et al., "Grid: Building a Robust Ad Hoc Network," Parallel and Distributed Operating Systems Group, M.I.T Laboratory for Computer Science.
Park et al., "A Highly Adaptive Distributed Routing Algorithm for Mobile Wireless Networks," IEEE, 1997.
Chunhung et al., "A Distributed Architecture for Multimedia in Dynamic Wireless Networks," Computer Science Department, University of California, Los Angeles.
Haas et al., "A New Routing Protocol for the Reconfigurable Wireless Networks," School of Electrical Engineering, Cornell University.
Johnson et al., "Dynamic Source Routing in Ad Hoc Wireless Networks," Computer Science Department, Carnegie Mellon University (also published in Imielinski and Korth, ed. "Mobile Computing", Kluwer Academic Publishers, 1996).
Broch et al., "A Performance Comparison of Multi–Hop Wireless Ad Hoc Network Routing Proposals," Proceedings of the Fourth Annual ACM/IEEE International Conference on Mobile Computing and Networking (MobiCom '98) Oct. 25–30, 1998.
Oteri, Oghenekome, "Ad–hoc Network Capacity," EE 360 Project.
Obraczka et al., "Multicast Routing Issues in Ad Hoc Networks," USC Information Sciences Institute.

* cited by examiner

Primary Examiner—Bob A. Phunkulh
(74) Attorney, Agent, or Firm—Kenyon & Kenyon

(57) ABSTRACT

A timely organized ad hoc network is provided, including at least one access point, and a plurality of network nodes operable to transmit and receive at least one node information message destined for the at least one access point, in which at least one of the plurality of network nodes transmits the at least one node information message to a first selected one of at least one neighboring destination, the first selected neighboring destination being selected in accordance with a dynamic self-routing protocol, the first selected neighboring destination including one of: i) the at least one access point, and ii) a first neighboring network node of the plurality of network nodes, if the at least one network node is prevented from directly transmitting the node information to the at least one access point.

43 Claims, 31 Drawing Sheets

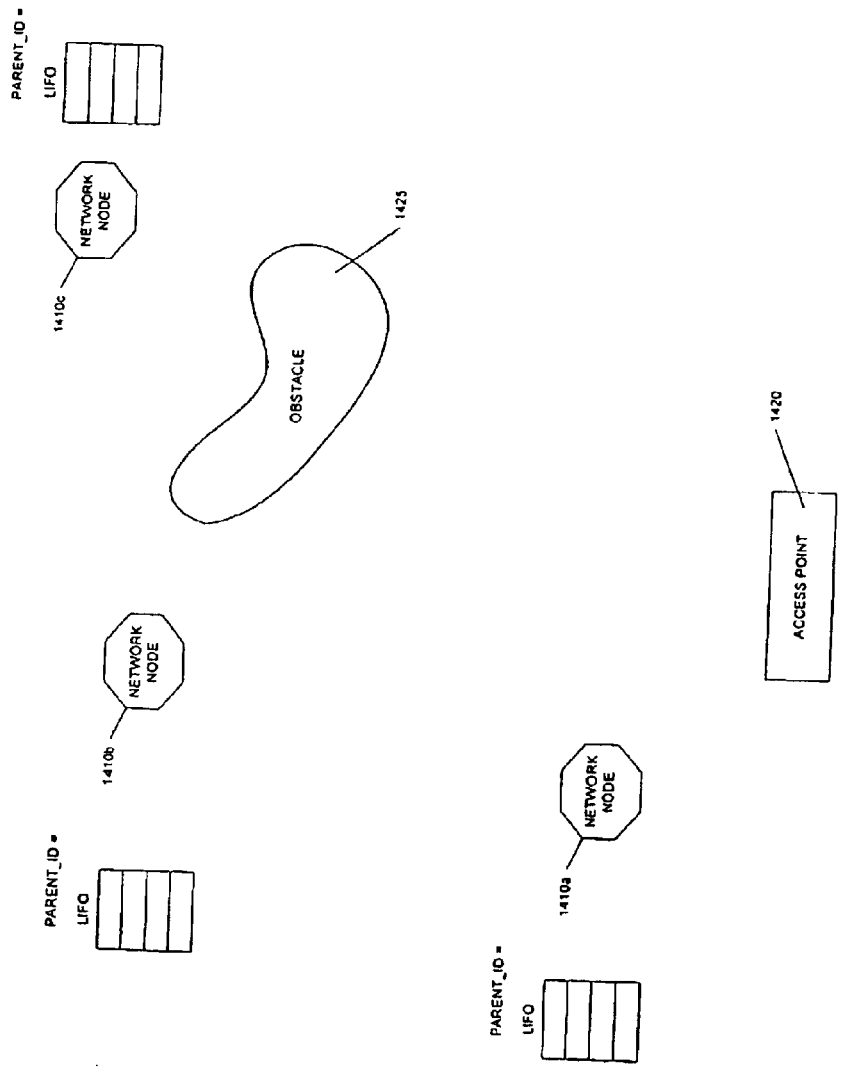

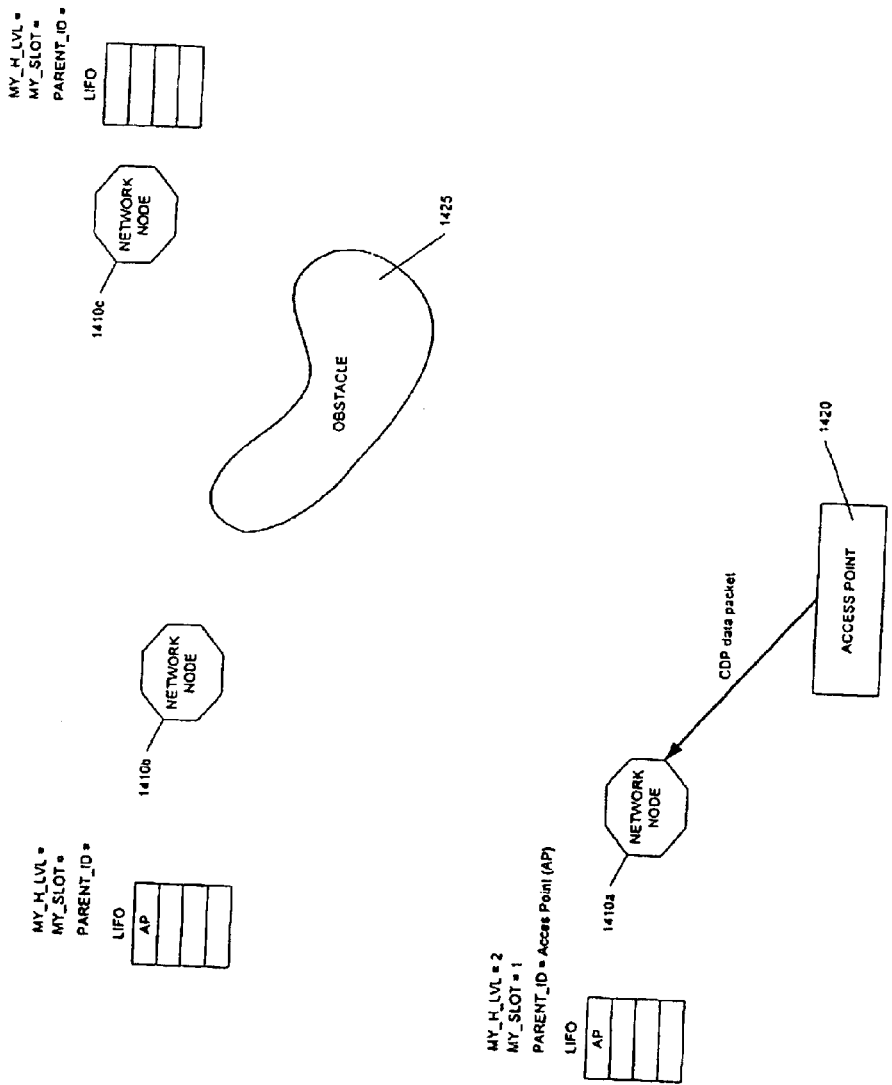

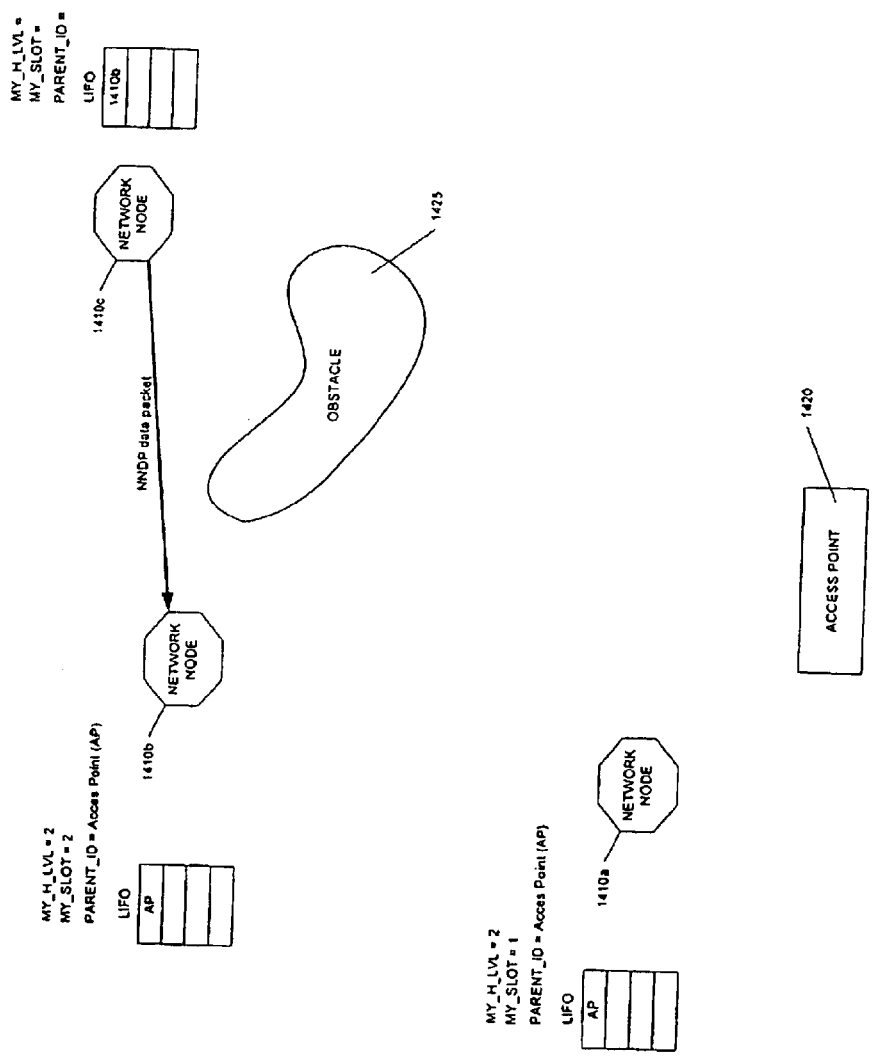

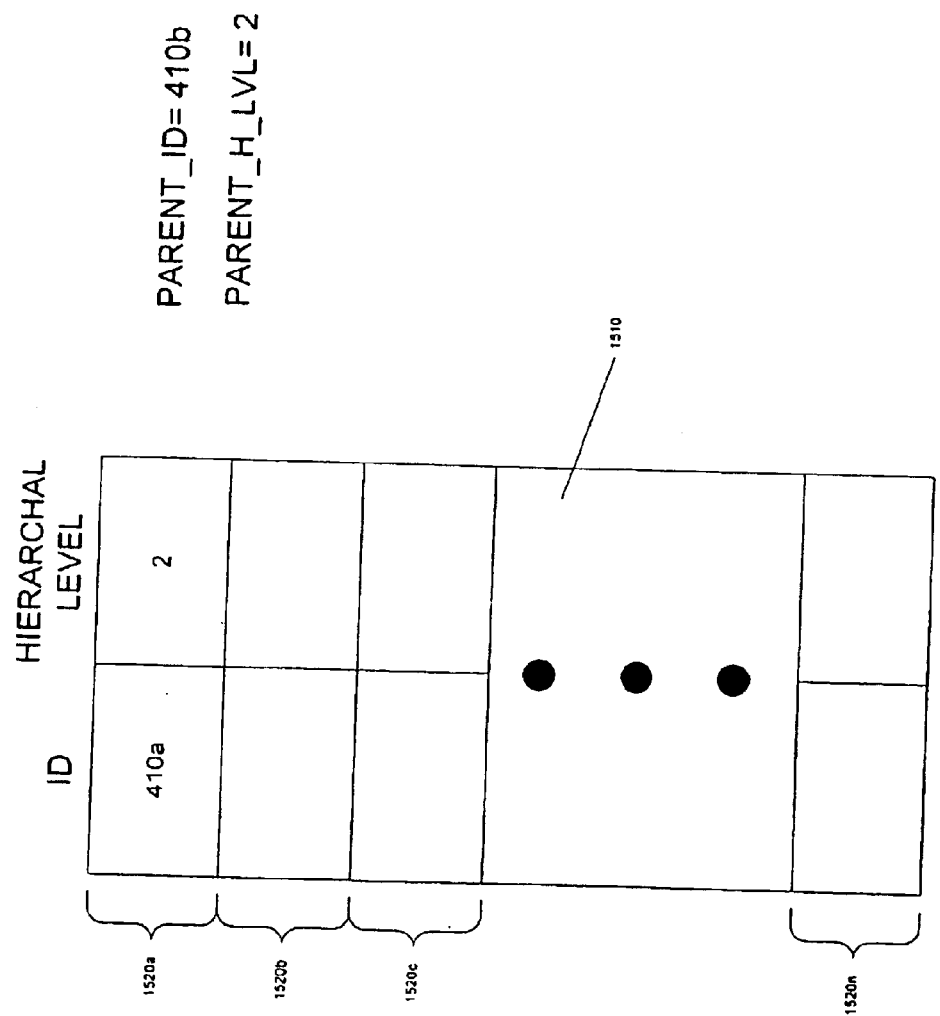

TIMELY ORGANIZED AD HOC NETWORK AND PROTOCOL FOR TIMELY ORGANIZED AD HOC NETWORK

FIELD OF THE INVENTION

The present invention relates to computer networks, such as wireless computer networks, and network protocols.

BACKGROUND INFORMATION

In certain locations, such as residential, commercial and industrial buildings, installations, etc., it may be desirous to monitor, control and/or collect information (e.g., node information) generated by one or more sensors and/or measuring or control devices distributed throughout the location. Since each of these sensors, measuring and/or control devices may be randomly distributed throughout the location, it is advantageous to provide the generated information to at least one centralized location, such as an access point, from which the information may be transferred to a local and/or remote server and database, analyzed and/or further processed.

For this purpose, each of the sensors, measuring and/or control devices may be hardwired to the centralized location. However, it is believed that this may be costly and inefficient, especially if new sensors, measuring and/or control devices need to be added at a subsequent time.

As an alternative, each of the sensors, measuring and/or control devices may be connected to, for example, a network node operable to wirelessly transmit and receive its respective node information to and from a centralized location. However, it is believed that such a system is difficult to implement, considering low power transmission requirements and possibly disadvantageous environmental conditions, if at least one of the network nodes is blocked, for example, by an obstacle, ambient noise, interference, etc., from transmitting or receiving its related node information.

SUMMARY OF THE INVENTION

It is an object of the present invention to provide a timely organized wireless ad hoc network, including at least one access point, and a plurality of network nodes operable to transmit and receive at least one node information message destined for the at least one access point, in which at least one of the plurality of network nodes transmits the at least one node information message to a first selected one of at least one neighboring destination, the first selected neighboring destination being selected in accordance with a dynamic self-routing protocol, the first selected neighboring destination including one of: i) the at least one access point, and ii) a first neighboring network node of the plurality of network nodes, if the at least one network node is prevented from directly transmitting the node information to the at least one access point.

It is another object of the present invention to provide the network as described above, in which the at least one network node is a source of at least a portion of the at least one node information message.

It is still another object of the present invention to provide the network as described above, in which at least a portion of the at least one node information message is transmitted to the at least one network node by another one of the plurality of network nodes.

It is yet another object of the present invention to provide the network as described above, in which the at least one network node is operable to transmit and receive the at least one node information message wirelessly using a timely organized communication method.

It is still another object of the present invention to provide the network as described above, in which the at least one network node is operable to transmit and receive the at least one node information message wirelessly using a TDMA communication method.

It is yet another object of the present invention to provide the network as described above, in which each of the plurality of network nodes is operable to be assigned to one of a plurality of time slots of an assigned time-slotted communications interval.

It is still another object of the present invention to provide the network as described above, in which the at least one access point is assigned one of a plurality of hierarchal levels, and each of the plurality of network nodes is operable to assign itself one of the plurality of hierarchal levels in accordance with a number of intervening transmissions required to ensure that the at least one node information message reaches the at least one access point.

It is yet another object of the present invention to provide the network as described above, in which the dynamic self-routing protocol selects the first selected neighboring destination in accordance with the hierarchal level assigned to the at least one neighboring destination.

It is still another object of the present invention to provide the network as described above, in which the dynamic self-routing protocol selects the first selected neighboring destination such that the hierarchal level assigned to the first selected neighboring destination is lower than the hierarchal level assigned to the at least one network node.

It is yet another object of the present invention to provide the network as described above, in which each of the plurality of network nodes is further operable to transmit its assigned hierarchal level.

It is still another object of the present invention to provide the network as described above, in which the dynamic self-routing protocol receives the hierarchal level assigned to the at least one neighboring destination from a transmission of the hierarchal level assigned to the at least one neighboring destination.

It is yet another object of the present invention to provide the network as described above, in which the transmission of the hierarchal level assigned to the at least one neighboring destination is transmitted by the at least one neighboring destination.

It is still another object of the present invention to provide the network as described above, in which the at least one network node is operable to package its hierarchal level and the at least one node information message into a data packet, the at least one network node being further operable to transmit the data packet.

It is yet another object of the present invention to provide the network as described above, in which the at least one network node transmits the data packet in accordance with the dynamic self-routing protocol.

It is still another object of the present invention to provide the network as described above, in which the at least one access point is operable to transmit at least one acknowledgment and/or command message destined for at least one source network node of the plurality of network nodes, the at least one source network node being a source of at least a portion of the at least one node information message.

It is still another object of the present invention to provide the network as described above, in which the at least one source network node is configured to retransmit the at least one acknowledgment and/or command message.

It is yet another object of the present invention to provide the network as described above, in which the at least one source network node is configured to retransmit the at least one acknowledgment and/or command message with a lower power than a normal operation.

It is yet another object of the present invention to provide the network as described above, in which each of the plurality of network nodes is operable to receive and transmit the at least one acknowledgment and/or command message.

It is yet another object of the present invention to provide the network as described above, in which each of the plurality of network nodes is assigned to one of the plurality of time slots in accordance with the at least one acknowledgment and/or command message.

It is still another object of the present invention to provide the network as described above, in which the dynamic self-routing protocol selects the first selected neighboring destination in accordance with the at least one acknowledgment and/or command message.

It is yet another object of the present invention to provide the network as described above, in which the at least one network node transmits the acknowledgment information to a second selected neighboring destination of the plurality of neighboring destinations, the second selected neighboring destination being selected by the dynamic self-routing protocol, the second neighboring destination including one of: i) the at least one source network node, and ii) a second neighboring network node of the plurality of network nodes, if the at least one network node is prevented from directly transmitting the at least one acknowledgment and/or command message to the at least one source network node.

It is still another object of the present invention to provide the network as described above, in which the dynamic self-routing protocol selects the second selected neighboring destination in accordance with the hierarchal level assigned to the at least one neighboring destination.

It is yet another object of the present invention to provide the network as described above, in which the dynamic self-routing protocol selects the second selected neighboring destination such that the hierarchal level assigned to the second selected neighboring destination is higher than the hierarchal level assigned to the at least one network node.

It is still another object of the present invention to provide the network as described above, in which the at least one network node receives the at least one node information message from the second selected neighboring destination, so that the at least one acknowledgment message is transmitted to the at least one source network node using a same path used by the at least one source network node to transmit the at least one node information message to the at least one access point.

It is yet another object of the present invention to provide a network node, including a microprocessor arrangement, a transceiver arrangement communicatively coupled to the microprocessor arrangement, and a device arrangement communicatively coupled to the microprocessor arrangement, the device arrangement receiving source node information from at least one of at least one sensor and at least one measuring device; wherein the microprocessor arrangement is configured to transmit the source node information to a first selected neighboring destination of at least one neighboring destination, the microprocessor transmitting the source node information via the transceiver arrangement; the first selected neighboring destination being selected in accordance with a dynamic self-routing protocol, the first selected neighboring destination including one of: i) at least one access point, and ii) a first network node of the plurality of network nodes, if the microprocessor arrangement is prevented from directly transmitting the source node information to the at least one access point via the transceiver arrangement.

BRIEF DESCRIPTION OF THE DRAWINGS

FIGS. 14a through 14l are a series of block diagrams showing an operational sequence of a third exemplary ad hoc wireless network upon power up.

FIGS. 15a through 15e are diagrams showing an exemplary dynamic self-routing protocol according to the present invention.

DETAILED DESCRIPTION

Figure 1:
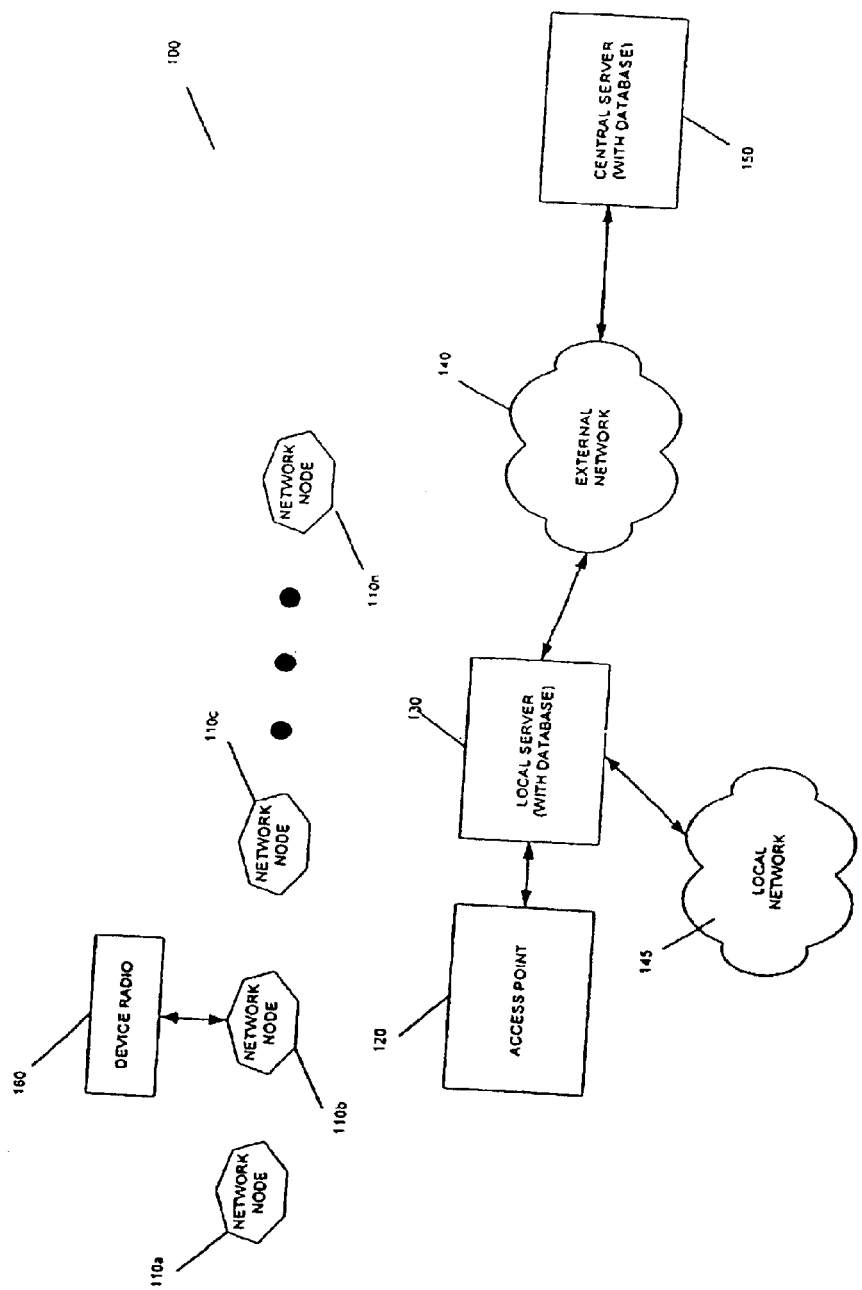
FIG. 1 is a block diagram of a first exemplary ad hoc wireless network according to the present invention.

Referring to FIG. 1, there is seen a first exemplary ad hoc wireless network 100 according to the present invention. Wireless network 100 includes a plurality of network nodes 110a, 110b, 110c, . . . , 110n, at least one access point 120, a local server (with database) 130 communicatively coupled to the access point 120, both and internal network 145 and an external network 140 communicatively coupled to the local server (with database) 130, a device radio 160 communicatively coupled to at least one of the network nodes 110a, 110b, 110c, . . . 110n, and a central server (with database) 150 communicatively coupled to the external network 140. Wireless ad hoc network 100 may be used, for example, to communicate node information within or outside a structure, such as an apartment building, a house, an office building, a residential building, a commercial building, an industrial building, etc.

The local server (with database) 130 includes a workstation, which executes specific software algorithms for monitoring and controlling devices connected to at least one of the network nodes 110a, 110b, 110c, . . . , 110n or to the device radio 160. The local server (with database) 130 collects and stores information and presents the information to a user connected to the same local network 145, for example, an Intranet.

The at least one access point 120 is the final destination of node information transmitted by one or more of the network nodes 110a, 110b, 110c, . . . , 110n. The node information may be received from one or more sensors and/or measuring devices (not shown), and may include, for example, the temperature of a room, lighting conditions of a room, energy usage, smoke and CO detector data, elevator (s) conditions, door activation data, HVAC (Heating and Air Conditioning system parameters), pressure data, vibration data, etc.

The device radio 160 functions similarly to at least one of the network nodes 110a, 110b, 110c, . . . , 110n, except that the device radio 160 may be, for example, battery powered and does not participate in network routing. For this purpose, the device radio 160 is configured to communicate with at least one network node during the random access time interval (or specially assigned time interval), after which the device radio may, for example, enter a "sleep mode" to conserve energy.

The central server (with database) 150 is responsible for collecting information from at least one local server, as well as from at least one database. The central server (with database) 150 is also configured to monitor and control the one or more sensors and/or measuring devices (not shown) connected to the network nodes 110a, 110b, 110c, . . . , 110n and/or to the device radio 160. The central server (with database) 150 may also be communicatively coupled to other computers, for example, via an Internet connection. In this manner, the central server (with database) 150 is operable to provide services to users wishing to control the ad hoc wireless network 100 from at least one remote location.

The external network 140 may include, for example, a wide area network (WAN), a local area network (LAN), an Intranet, the Internet, etc. The external network 140 communicatively couples the local server (with database) 130 with the central server (with database) 150. In this manner, the external network 140 permits the local server (with database) 130 and the central server (with database) 150 to communicate across relatively large distances.

The local server (with database) 130 is configured to provide information concerning the layout of the physical site, within which the as hoc wireless network is implemented. The local server (with database) 130 is also configured to update newly added sensors and/or measuring devices (not shown) connected to the ad hoc network. The central server (with database) 150 may, for example, provide software updates, new administration information, new software parameters, etc., to the local server (with database) 130.

When wirelessly transmitting node information to the access point 120, each of the network nodes 110a, 110b, 110c, . . . , 110n may utilize any radio communication method, such as, for example, spread spectrum, Frequency Division Multiple Access, and/or Time Division Multiple Access (TDMA).

A spread spectrum communication method, which may include Direct Sequence Spread Spectrum (DSSS) or Frequency Hoping Spread Spectrum (FHSS), "spreads" a transmitted signal across a frequency bandwidth much greater than that necessary to send the original signal. For this purpose, the signal may be spread using a pseudorandom code independent of the signal. This may result in many benefits, such as immunity to interference and jamming. After transmission, a spread spectrum receiver synchronizes to the spread spectrum signal (i.e., acquires the spread spectrum signal) and de-spreads the data.

FDMA is yet another radio communication method that permits multiple access communications. In FDMA, each of the multiple users, for example, the network nodes 110a, 110b, 110c, . . . , 110n, is assigned a unique frequency bandwidth, within which it may transmit its node information. The mutual exclusivity of each of the unique frequency bandwidths permits each of the multiple users, for example, the network nodes 110a, 110b, 110c, . . . , 110n, to transmit its respective node information at the same time without interference.

TDMA is still another radio communication method that permits multiple access communications. In TDMA, each of multiple users, for example, the network nodes 110a, 110b, 110c, . . . , 110n, is assigned a specific time slot, during which it may transmit its node information. In this manner, TDMA permits the users to access the same frequency bandwidth at different times.

As discussed below, any radio communications method that permits timely organized radio communication may be used. In this manner, it is believed that a timely organized radio communication method introduces order into an otherwise random transmission multi-node ad hoc wireless network. In this manner, a timely organized radio communication method may allow for a robust, self-building, self-routing, dynamic ad hoc network architecture, which is easily expandable.

In the various exemplary ad hoc networks according to the present invention described below, a timely organized radio communication method is utilized. However, persons having ordinary skill in the art will recognize that the present invention is independent of the communication methods and/or the modulation schemes utilized, such as, for example, phase modulation schemes, frequency modulation schemes, amplitude modulation schemes, pulse modulation schemes and/or any combination of these modulation schemes. Furthermore, although the timely organized radio communication method described below utilizes a single frequency band, persons having ordinary skill in the art will recognize that the present invention may simultaneously utilize different frequency bands to increase the number of network nodes 110a, 110b, 110c, . . . , 110n and/or the amount of information capable of being transmitted through the network.

Figure 2:
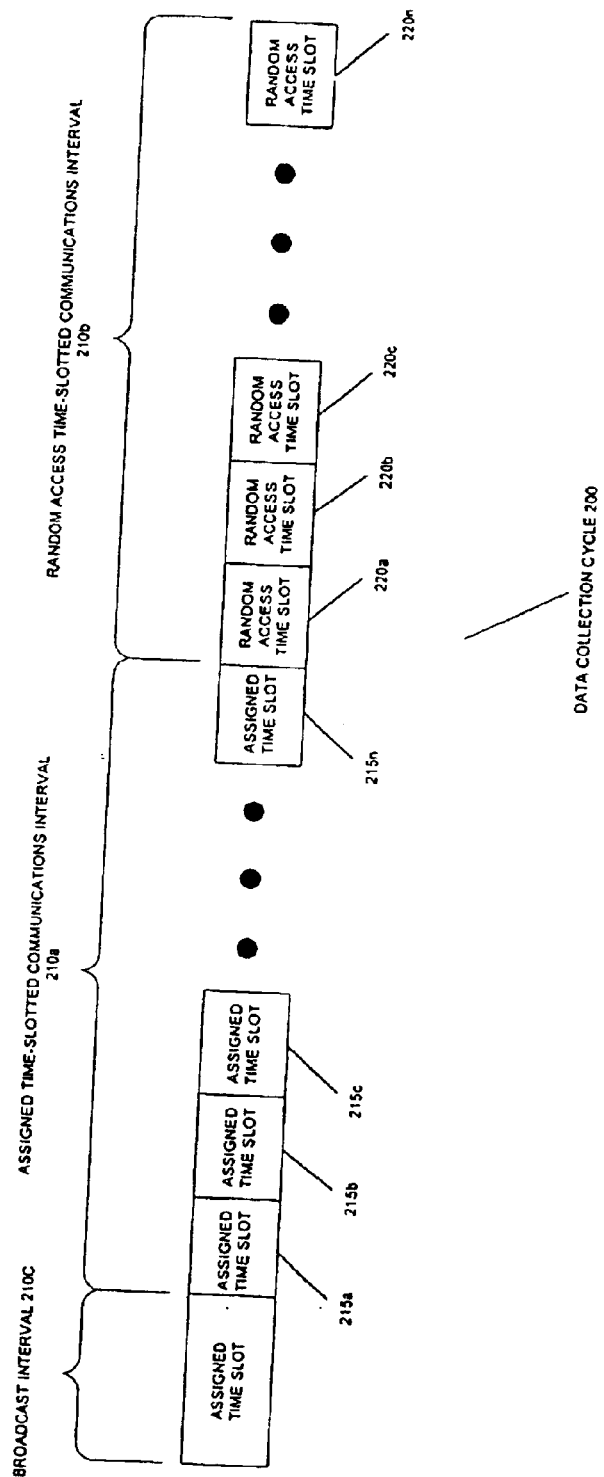
FIG. 2 is a diagram of an exemplary Timely Organized Ad Hoc Network data collection cycle according to the present invention.

Referring now to FIG. 2, there is seen an exemplary timely organized data collection cycle 200 according to the present invention, data collection cycle 200 being indefinitely repetitive. Data collection cycle 200 is divided into a broadcast interval 210c, an assigned time-slotted communications interval 210a, and a random access time-slotted communications interval 210b. The assigned time-slotted communication interval 210a includes a plurality of assignable time slots 215a, 215b, 215c, . . . , 215n, and the random access time-slotted communication interval 210b includes a plurality of random access time slots 220a, 220b, 220c, ..., 220n.

At any given time, each of the network nodes 110a, 110b, 110c, ..., 110n, is either assigned to one of the assignable time slots 215a, 215b, 215c, ..., 215n or assigned to none of the assignable time slots 215a, 215b, 215c, ..., 215n. If a network node, for example, network node 110a, is not assigned to one of time slots 215a, 215b, 215c, ..., 215n, that node transmits node information during one of the random access time slots 220a, 220b, 220c, ..., 220n of the random access time-slotted communication interval 210b, until the network node receives information from the access point 120 that permits it to determine which of time slots 215a, 215b, 215c, ..., 215n to transmit node information in.

After determining the assignable time slot 215a, 215b, 215c, ..., 215n within which to transmit, the network node, for example, network node 110a, stops transmitting during the random access time-slotted communication interval 210b and begins transmitting during its newly assigned time slot 215a, 215b, 215c, ..., 215n of the assigned time-slotted communication interval 210a.

Figure 3A:
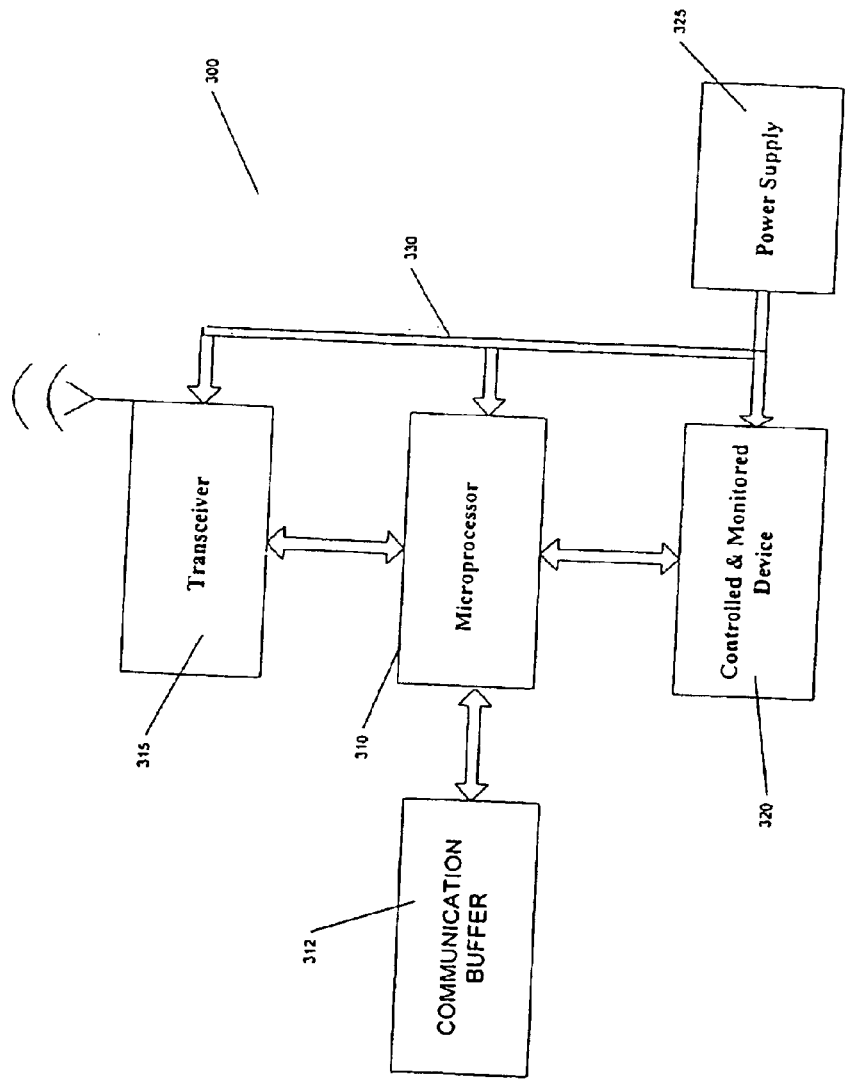
FIG. 3a is a block diagram of an exemplary network node according to the present invention.

Referring now to FIG. 3a, there is seen a block diagram of an exemplary network node 300 according to the present invention. Network node 300 includes a microprocessor 310, a transceiver 315 communicatively coupled to the microprocessor 310, a device 320 also communicatively coupled to the microprocessor 310, a communication buffer 312, and a power supply 325 for providing power to each of the microprocessor 310, the transceiver 315, the communication buffer 312, and the device 320 via power bus 330. The device 320 may be, for example, a sensor, a measuring and/or controlling device, or an interface.

Figure 3B:
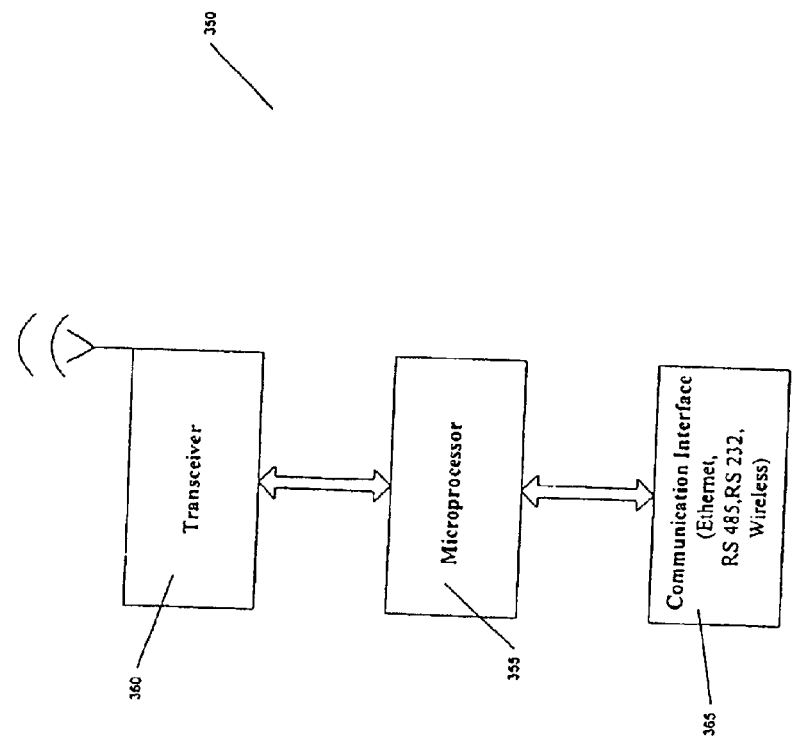
FIG. 3b is a block diagram of an exemplary access point according to the present invention.

Referring now to FIG. 3b, there is seen a block diagram of an exemplary access point 350 according to the present invention. Access point 350 includes a microprocessor 355, a transceiver 360 communicatively coupled to the microprocessor 355, and a communications interface 365 communicatively coupled to the microprocessor 355.

The access point 350 operates as a communication interface to the radio transceiver 360, the local server (with database) 130 and to other access points (not shown), using independent communication processes. For this purpose, the access point 350 may be provided, for example, with a communication buffer (not shown). It is believed to be advantageous to provide large area installations with a plurality of distributed access points, each of which is communicatively coupled to the same communication line or network. In this manner, each of the access points may operate independently, i.e., with no master-slave relationships, and one or any number of the access points may form a common and/or a plurality of independent timely organized ad hoc networks with at least one of the plurality of network nodes.

In operation, each of the network nodes 110a, 110b, 110c, ..., 110n is operable to wirelessly communicate its respective node information to the access point 120 via its respective transceiver 315. In this manner, each of the network nodes 110a, 110b, 110c, ..., 110n operates as a source of information to be transmitted. A source network node transmits its respective node information only during its assigned time slot 215a, 215b, 215c, ..., 215n, or during one of the random access time slots 220a, 220b, 220c, ..., 220n if the none of the time slots 215a, 215b, 215c, ..., 215n are assigned to the source network node.

Additionally, each of the network nodes 110a, 110b, 110c, ..., 110n is operable to repackage and retransmit node information transmitted by at least one neighboring network node 110a, 110b, 110c, ..., 110n. This "retransmission" may be required, for example, if a neighboring network node 110a, 110b, 110c, ..., 110n is prevented from directly transmitting its node information to the access point 120, for example, due to obstacles, interference, noise, jamming, power limitations, propagation losses, etc. In this case, a "transmission chain" is utilized, in which a "chain" of network nodes 110a, 110b, 110c, ..., 110n serially retransmits the node information originally transmitted by a source network node (i.e., the network nodes that originates the node information). In this manner, the node information has a higher probability of reaching the access point 120. A network node retransmitting information during a "chain transmission", does so during the time slot 215a, 215b, 215c, ..., 215d assigned to the source network node, or during one of the random access time slots 220a, 220b, 220c, ..., 220n if none of the time slots 215a, 215b, 215c, ..., 215n are assigned to the source network node.

Each of the network nodes 110a, 110b, 110c, ..., 110n dynamically assigns itself a hierarchal level based on information (e.g., data packets) received from other network nodes 110a, 110b, 110c, ..., 110n. The hierarchal level is self-assigned in accordance with the shortest path to the access point 120. That is, the hierarchal level depends on the number of intervening transmissions to other network nodes 110a, 110b, 110c, ..., 110n required to ensure that the original transmission (i.e., node information) reaches the access point 120. Thus, if a network node, for example, network node 110a, is capable of transmitting its node information to the access point directly, without an intervening transmission to another network node, it will self-assign a hierarchal level that is different (e.g., lower) than the hierarchal level of another network node that must initiate at least one intervening transmission to a neighboring network node to ensure that its node information reaches the access point 120.

In one exemplary embodiment according to the present invention, the access point is assigned a hierarchal level of, for example, "1", and each of the network nodes 110a, 110b, 110c, ..., 110n assigns itself a hierarchal level, for example, equal to the incremented minimum hierarchal level of the neighboring (e.g., intervening) network nodes it is capable of directly communicating with. For this purpose, each of the network nodes 110a, 110b, 110c, ..., 110n transmits data packets including that node's hierarchal level, as well as an ID value that uniquely identifies the transmitting network node. These transmitted data packets may be received by neighboring network nodes 110a, 110b, 110c, ..., 110n, each of which stores the transmitted hierarchal level and the transmitting network node's ID value in a Last In First Out (LIFO) memory buffer, so that the ID and hierarchal level of the neighboring network node with the lowest hierarchal level is kept at the top of the LIFO stack. In this manner, when a particular one of the network nodes 110a, 110b, 110c, ..., 110n transmits node information (e.g., data packets), the node information is addressed and sent to the network node and/or the access point 120 at the top of the stack (or to the network node addressed by a PARENT_ID, as more fully described below).

Figure 4:
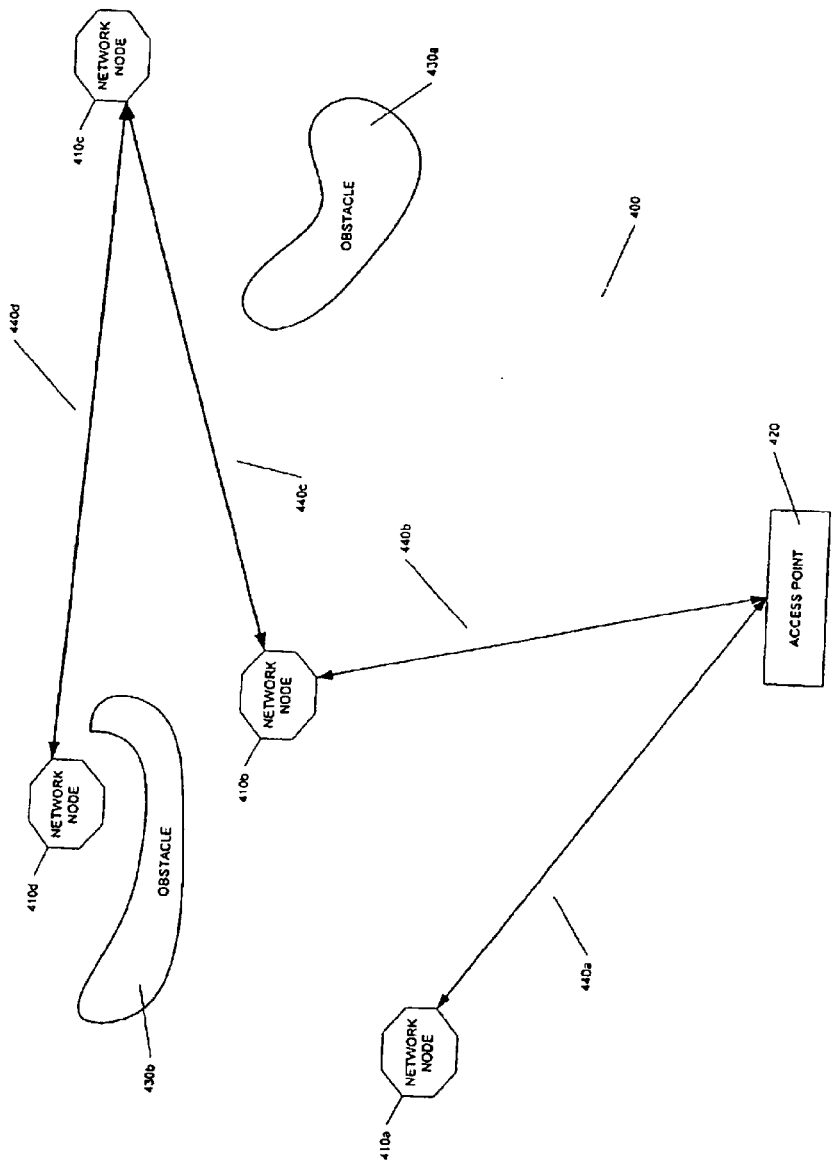
FIG. 4 is a block diagram of a second exemplary ad hoc wireless network according to the present invention.

Referring now to FIG. 4, there is seen an exemplary ad hoc network 400 according to the present invention, in which network nodes have self-assigned hierarchal levels. Add hoc network 400 includes access point 420 and network nodes 410a, 410b, 410c, 410d. The network 400 also includes transmission paths 440a, 440b, 440c, 440d, as well as obstacles 430a, 430b, which block direct transmission from network nodes 410c and 410d, respectively. In this exemplary embodiment, the access point 420 is fixedly assigned a hierarchal level of "1", and network nodes 410a, 410b each assign themselves a hierarchal level of "2", since each of these nodes 410a, 410b is capable of transmitting node information directly to the access point 420 via transmission paths 440a, 440b, respectively.

Network node 410c is not capable of transmitting its node information directly to the access point 420, due to obstacle 430a. Thus, network node 410c must engage in a "chain transmission." That is, network node 410c must engage in at least one intervening transmission to network node 410b to ensure that its node information reaches the access point 420. For this purpose, network node 410c transmits its node information directly to network node 410b via transmission path 440c, after which network node 410b repackages and retransmits the node information directly to the access point 420 via transmission path 440b. Since network node 410c must initiate one intervening transmission to network node 410b, the network node 410c assigns itself a hierarchal level of "3".

In similar fashion, obstacle 430b prevents network node 410d from directly transmitting node information to network nodes 410a, 410b and the access point 420. Thus, network node 410d must transmit its node information to network node 410c via transmission path 440d, after which network node 410c repackages and retransmits the node information to network node 410b via transmission path 440c, and then network node 410b repackages and retransmits the node information directly to the access point 420 via transmission path 440b. Since network node 410d must engage in two intervening transmissions to network nodes 410d, 410b, network node 410d assigns itself a hierarchal level of "4".

It should be noted that obstacles 430a, 430b may include any device, object, mechanism, or phenomenon capable of preventing a direct wireless transmission. For example, obstacles 430a, 430b may include a wall, ambient noise, a moving object (such as a person), propagation losses, and/or a jamming device operable to prevent direct wireless transmission.

It should also be noted that, although FIG. 4 shows only four network nodes 410a, 410b, 410c, 410d and one access point 420, the timely organized ad hoc wireless network 400 may include any number of network nodes and any number of access points, for example, one or many network nodes and one access point, five network nodes and three access points, 700 network nodes and six access points, etc.

It should also be noted that, although FIG. 4 shows each of network nodes 410a, 410b, 410c, 410d self-assigning a hierarchal level that increases with the required number of intervening transmissions, the hierarchal level may be assigned in other ways For example, each of the network nodes 410a, 410b, 410c, 410d may assign itself a hierarchical level that decreases with the required number of intervening transmissions. Or, alternatively, each of the network nodes 410a, 410b, 410c, 410d may assign itself a hierarchical level having no chronological correlation to the required number of intervening transmissions. Or, alternatively, each of the network nodes 410a, 410b, 410c, 410d may assign itself a hierarchical level in accordance with a suitably designed algorithm that depends on the number of intervening transmissions to neighboring network nodes required to ensure that node information reaches the access point 420.

Figure 5:
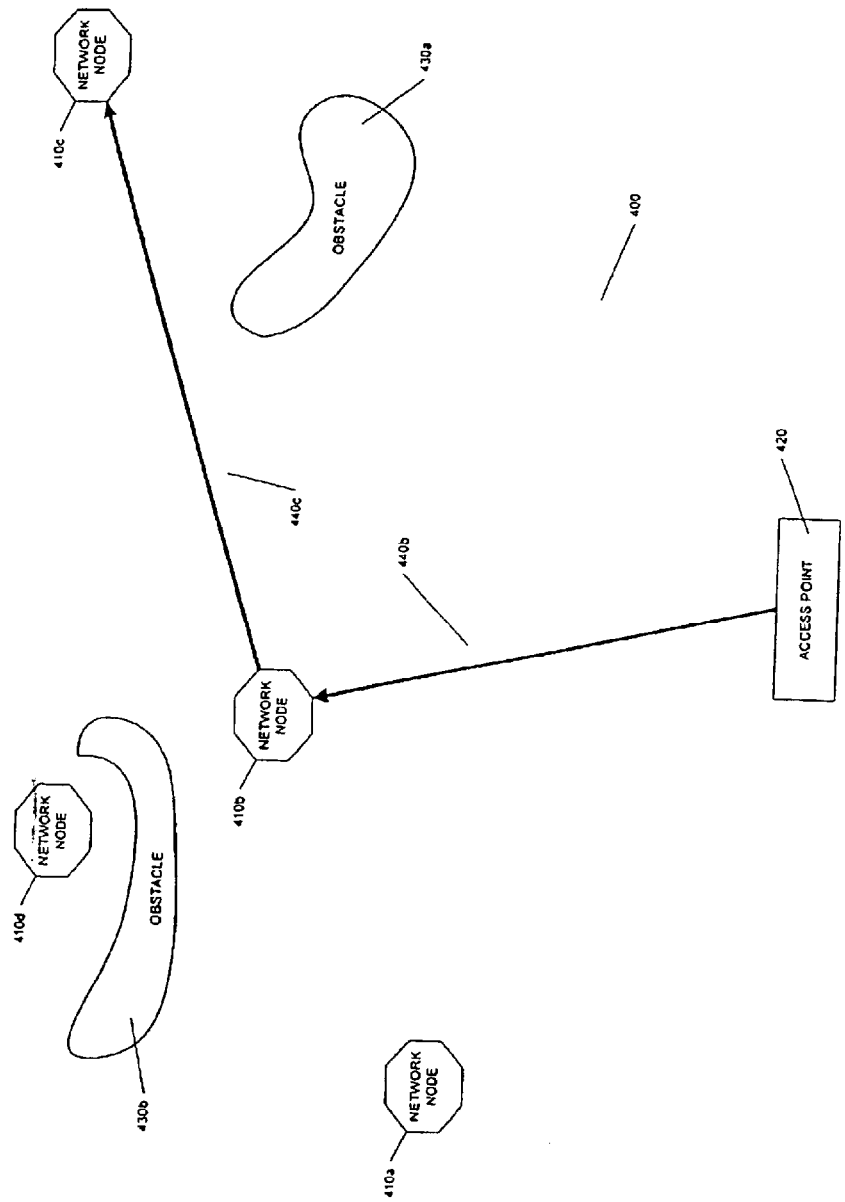
FIG. 5 is a block diagram of the second exemplary ad hoc wireless network of FIG. 4, in which an access point transmits acknowledgment and/or command information to a network node.

Referring now to FIG. 5, there is seen the exemplary ad hoc wireless network 400 shown in FIG. 4, in which the access point 420 transmits acknowledgment and/or command information to network node 410c to acknowledge receipt of node information originally transmitted by source network node 410c and/or give some command to source network node 410c. In this exemplary embodiment, network node 410c is the "source" of node information transmitted during one of its assigned time slot 215a, 215b, 215c, . . . , 215n. To ensure that the node information transmitted by network node 410c reaches the access point 420, network node 420b engages in a "chain transmission" by retransmitting the node information to the access point 420. After receiving the node information originated by source network node 410c, the access point 420 transmits acknowledgment and/or command information to source network node 410c via the same transmission path (i.e., the same chain transmission path) used to communicate the node information to the access point 420, except in reverse order. Thus, the access point 420 transmits the acknowledgment and/or command information to network node 410b, after which network node 410b retransmits the acknowledgment and/or command information to source network node 410c.

The communications between the access point 120 and each of the network nodes 110a, 110b, 110c, . . . , 110n may be accomplished, for example, using differently formatted data packets, for example, three differently formatted data packets. Below is described an exemplary 3-type data packet communications scheme for communications between the network nodes 110a, 110b, 110c, . . . , 110n and the access point 120. Alternatively, other types of data communications schemes may be employed, such as a 2-type data packet scheme, a 5-type data packet scheme, etc, and each of the packets may be transmitted, for example, as a serial stream of smaller packets, if and when the communication channel becomes less reliable.

As stated above, the exemplary timely organized ad hoc wireless network 100 may utilizes a 3-type data packet communications scheme, which may include, for example, a broadcast data packet (BCDP), a network node data packet (NNDP), and a acknowledge/command data packet (CDP).

The BCDP data packet is a data packet transmitted by the access point 120 to all of the network nodes 110a, 110b, 110c, . . . , 110n during the broadcast interval 210c of each data collection cycle 200. To help ensure that all of the network nodes 110a, 110b, 110c, . . . , 110n receive the BCDP data packet, each of the network nodes 110a, 110b, 110c, . . . , 110n, receiving the BCDP subsequently retransmits the BCDP data packet after a randomly calculated delay. In this manner, the BCDP has a higher probability of reaching all the network nodes 110a, 110b, 110c, . . . , 110n. The BCDP data packet contains information that permits the network nodes 110a, 110b, 110c, . . . , 110n to synchronize to one another. This "synchronization" may be necessary, for example, in a timely organized time-slotted communication method, since each of the network nodes 110a, 110b, 110c, . . . , 110n must determine its time to transmit information (TTT) with respect to all other network nodes.

The NNDP data packet is a data packet transmitted by one of the network nodes 110a, 110b, 110c, . . . , 110n, the NNDP data packet being ultimately destined for the access point 120. The NNDP data packet contains node information received from one or more sensors, measuring and/or controlling devices (not shown). The node information may include, for example, the temperature of a room, lighting conditions of a room, energy usage, etc. The NNDP data packet is originally transmitted by a source network node and repackaged and retransmitted by at least one neighboring network node, if a "chain transmission" is required to ensure that the NNDP data packet reaches the access point 120. Both the original transmission of the NNDP data packet and any required retransmissions of the NNDP data packet occur during the same time slot used by the source network node to transmit the NNDP data packet (i.e., one of assignable time slots 215a, 215b, 215c, ... , 215d or random access time slot 220a, 220b, 220c, ... , 220n. In a timely organized communication method, for example, each of the network nodes 110a, 110b, 110c, ... , 110n may originally transmit at least one NNDP data packet during its assigned time slot. Depending on its self-assigned hierarchical level, the NNDP may be directly transmitted to the access point 120 or may be transmitted to at least one other network node 110a, 110b, 110c, ... , 110n, if a chain transmission is required. The NNDP data packet contains the respective node information, as well as auxiliary information used by other network nodes 110a, 110b, 110c, ... , 110n for routing the node information to the access point 120, if a chain transmission is required. Depending on the type of network node and the amount of data contained within the node information, any of the network nodes 110a, 110b, 110c, ... , 110n may transmit more than one, for example, five, NNDP data packets dunng one transmission session, for example, during one assigned time slot 215a, 215b, 215c, ... , 215n in a timely organized communication method.

The CDP data packet is a data packet transmitted by the access point 120 to the source network node after the access point 120 receives the NNDP data packet(s) originally transmitted by the source network node. The CDP data packet includes acknowledgment information, as well as optional command information. The acknowledgment information may be used by the source network node, for example, to determine its assigned time slot 215a, 215b, 215c, ... , 215n. The optional command information may include, for example, at least one command to be executed by the source network node. The command may, for example, turn off/on an air conditioner, regulate the opening of the steam valve for heating, set and update certain parameters for a local controller, turn on an alarm, display certain message(s), etc.

The access point 120 transmits the CDP data packet during the same time slot used by the source network node to transmit the NNDP data packet(s) (i.e., during one of assignable time slots 215a, 215b, 215c, ... , 215d or random access time slot 220a, 220b, 220c, ... , 220n.

In one exemplary embodiment according to the present invention, the access point 120 transmits the CDP data packet to the source network node using the same path (i.e., the same transmission chain) used by the source network node to transmit its NNDP data packet(s) to the access point 120. For example, referring again to FIGS. 4 and 5, since network node 410c transmits its NNDP data packet(s) to the access point 420 via network node 410b, the access point 420 transmits the corresponding CDP data packet to network node 410c via network node 410b.

As described above, the CDP data packet may contain, for example, information that permits the source network node to determine its assigned time slot 215a, 215b; 215c, ... , 215n. However, once assigned, the time slot may be lost if, for example, the NNDP data packet transmitted by the source network node never reaches the access point 120 or if the CDP data packet transmitted by the access point 120 never reaches the source network node, for example, due to noise, interference, jamming, etc. If this is the case, those network nodes 110a, 110b, 110c, ... , 110n, which have not yet received a data packet (e.g., a CDP data packet), as well as those network nodes 110a, 110b, 110c, ... , 110n which have lost their time slot, transmit their respective NNDP data packet(s) during one of the random access time slots 220a, 220b, 220c, ... , 220n of the random access communications interval 210b. In this manner, the access point 120 may receive the NNDP data packet(s) transmitted during the random access communications interval 210b, after which it may transmit appropriately addressed CDP data packets. As described above, each of the CDP data packets contains information that permits a respective network node to determine its assigned time slot 215a, 215b, 215c, ... , 215n, which may then be used during the next data collection cycle 200.

Figure 6:
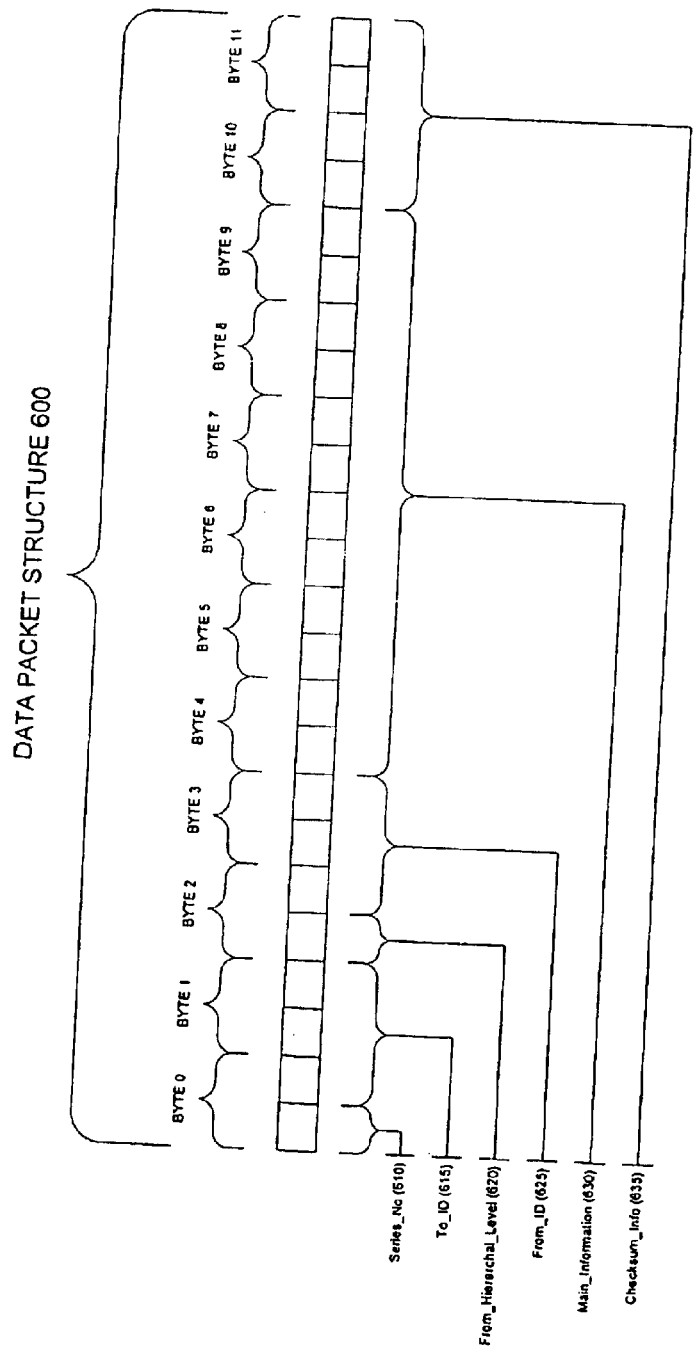
FIG. 6 is a diagram of an exemplary data packet structure according to the present invention.

Referring now to FIG. 6, there is seen further detail of an exemplary data packet structure 600 according to the present invention. Each of the BCDP, NNDP, and CDP data packets may include, for example, 12 bytes (0 through 11). Bytes 0 and 1 are a combination of a Series_No 610 (½ Byte), indicating the data collection cycle number originated by the access point, and a to_ID 615 (1½ Bytes) that uniquely identifies the intended destination of the data packet, such as one of the neighboring network nodes 110a, 110b, 110c, ... , 110n or the access point 120. For a BCDP data packet, the to_ID 615 does not address a particular network node, since every network node 110a, 110b, 110c, ... , 10n is an intended destination of the BCDP data packet. Instead, the to_ID may be set to, for example, all binary 1s (hexadecimal: FFF). The first nibble (i.e., 4 bits) of byte 2 contains the from_hierarchical_level 620, which is either the hierarchal level of the transmitting network node, or the hierarchical level of the transmitting access point 120 (e.g., "1"). The second nibble of byte 2 and byte 3 contain a from_ID 625 that uniquely identifies either the transmitting network node, i.e., one of the network nodes 110a, 110b, 110c, ... , 110n or the transmitting access point 120.

Bytes 4–9 contain the main_information 630. The format and content of the main_information 630 depend on the type of data packet (e.g., BCDP, NNDP, CDP), as described below. Bytes 10 and 11 contain checksum_info 635 used to store a calculated checksum of the transmitted data packet. This may permit, for example, the intended destination of the data packet to detect bit errors in a received data packet and, if necessary, initiate appropriate measures. In lieu of or in addition to checksum_info 635, bytes 10 and 11 may contain other information suitable to detect and/or correct errors in the received data packet, such as a hash code, error correction codes, etc.

Figure 7:
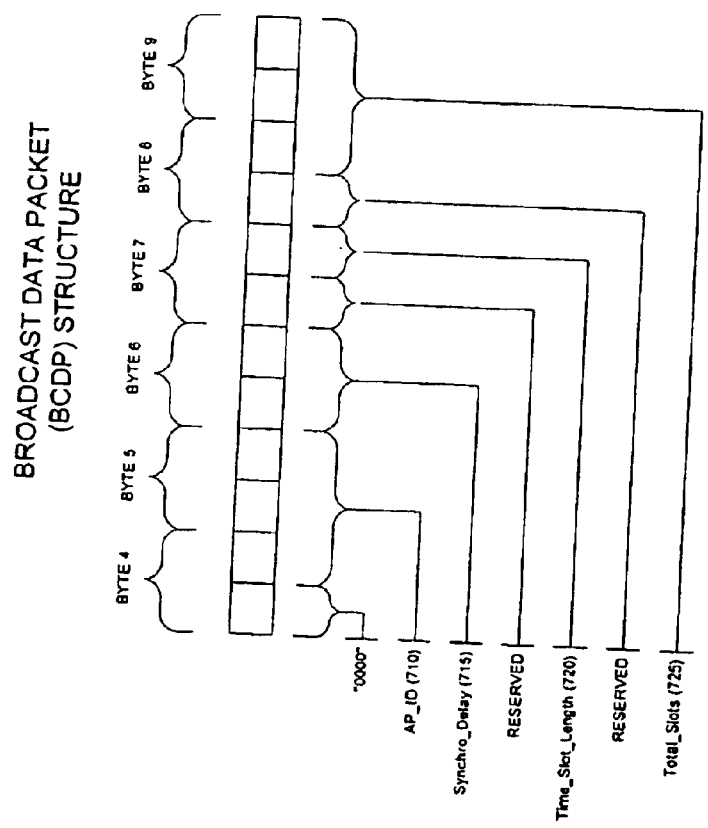
FIG. 7 is a diagram of an exemplary data structure of bytes 4–9 of a BCDP data packet.

The format and content of bytes 4–9 depend on the type of data packet. Referring now to FIG. 7, there is seen an exemplary data structure of bytes 4–9 of a BCDP data packet. The first nibble of byte 4 is set to, for example, "0000". The second nibble of byte 4 and byte 5 contain the AP_ID 710, i.e., a unique identifier assigned to the access point 120 (1½ bytes). Byte 6 contains a synchro_delay 715, which is used by the network nodes 110a, 110b, 110c, ... , 110n to synchronize to one another. Synchronization may be necessary, for example, in a timely organized communications scheme, in which each of the network nodes 110a, 110b, 110c, ... , 110n is assigned a respective time slot 215a, 215b, 215c, ... , 215n, within which to transmit its information. The synchro_delay 715 is set in accordance with a subsequent time at which the network node assigned to the first time slot 215a should begin transmission of a first NNDP data packet. Each of the network nodes 110a, 110b, 110c, ... , 110n uses the synchro_delay 715 to calculate a timeout between the moment of receiving the BCDP data packet and this subsequent time to transmit. Upon retransmitting the BCDP data packet to neighboring network nodes 110a, 110b, 110c, . . . , 110n, each of the network nodes 110a, 110b, 110c, . . . , 110n recalculates and changes the synchro_delay 715 by subtracting a value representing the delay between receiving the BCDP data packet and retransmitting it.

The first nibble of byte 7 is reserved in this exemplary embodiment. However, it should be appreciated that the first nibble of byte 7 may contain any additional information. The second nibble of byte 7 includes a time_slot_length 720, which indicates the size of each respective time slot 215a, 215b, 215c, . . . , 215d assigned to each of the network nodes 110a, 110b, 110c, . . . , 110n. In this exemplary embodiment, each time slot 215a, 215b, 215c, . . . , 215d has the same length. The time_slot_length 720 is calculated in accordance with the total number of network nodes 110a, 110b, 110c, . . . , 110n and the maximum time required for the network node assigned the highest hierarchical level to transmit its node information to the access point 120. Thus, the time_slot_length 720 necessarily determines the maximum number of NNDP data packets that may be transmitted and/or retransmitted by a network node during its respective time slot 215a, 215b, 215c, . . . , 215n.

The first nibble of byte 8 is reserved in this exemplary embodiment. However, it should be appreciated that the first nibble of byte 8 may contain any additional information.

The second nibble of byte 8 and byte 9 contain total_slots 725, which include the total number of assignable time slots 215a, 215b, 215c, . . . , 215d in the assigned time-slotted communications interval 210a, which depends on the total number of network nodes 110a, 110b, 110c, . . . , 110n in the timely organized ad hoc wireless network 100.

Figure 8:
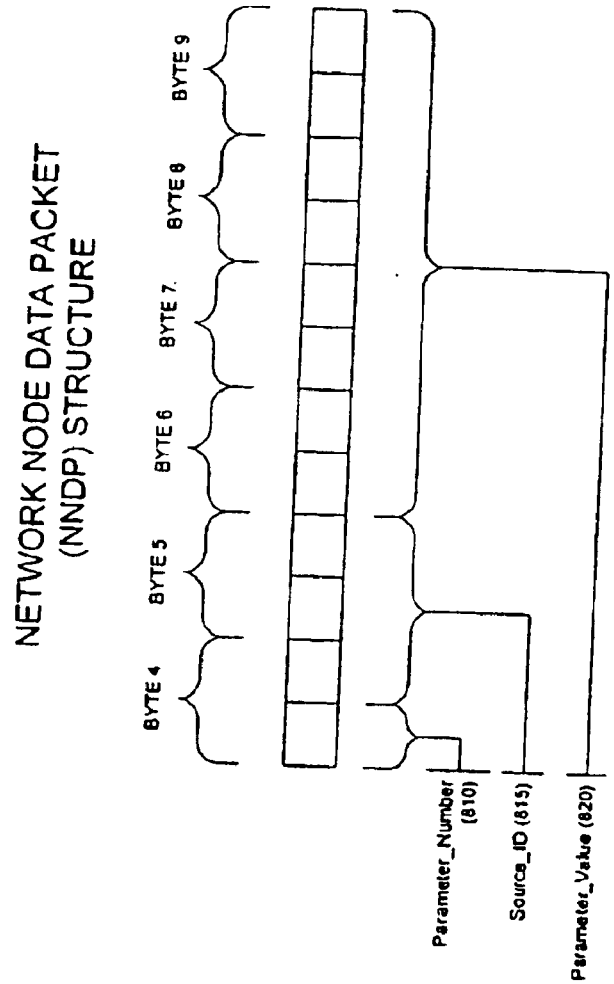
FIG. 8 is a diagram of an exemplary data structure of bytes 4–9 of a NNDP data packet according to the present invention.

Referring now to FIG. 8, there is seen an exemplary data structure of bytes 4–9 of an NNDP data packet. The first nibble of byte 4 contains a parameter_number 810 that uniquely identifies a particular NNDP data packet within a series of NNDP data packets transmitted by a source network node during its respective time slot 215a, 215b, 215c, . . . , 215n. For example, if network node 110a transmits three NNDP data packets during its assigned time slot, the first NNDP may have a parameter_number 810 of "0000", the second NNDP may have a parameter_number 810 of "0001", and the third NNDP may have a parameter_number 810 of "0010". It should be appreciated, however, that the parameter_number 810 need not be consecutively assigned to a respective NNDP data packet. For example, a special parameter_number 810, such as "1111" or "1110", may be used to indicate the last NNDP data packet transmitted within an assigned time slot.

The second nibble of byte 4 and byte 5 contain a source_ID 815 that uniquely identifies the network node that is the source of the originally transmitted NNDP data packet(s) (i.e., the source network node).

Bytes 6–9 contain a parameter_value 820, i.e., the main node information, for example, the temperature of a room, the lighting conditions of a room, the energy usage, etc.

Figure 9:
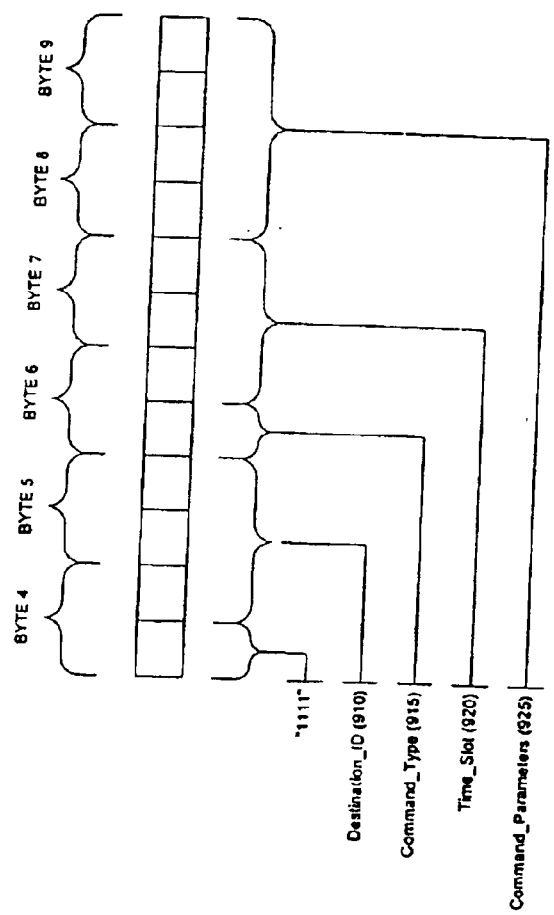
FIG. 9 is a diagram of an exemplary data structure of bytes 4–9 of a CDP data packet according to the present invention.

Referring now to FIG. 9, there is seen an exemplary data structure of bytes 4–9 of a CDP data packet. The first nibble of byte 4 contains hex F or binary "1111," which indicates that the CDP data packet is addressed to the source network node.

The second nibble of byte 4 and byte 5 contain the destination_ID 910 of the network node intended to receive and process the CDP data packet (i.e., the network node 110a, 110b, 110c, . . . , 110n that was the source of the last received NNDP data packet(s)).

The first nibble of byte 6 contains a command_type 915, which indicates one of a series of commands to be executed by the network node identified by the destination_ID 910. If the CDP data packet does not include a command to be executed, the command_type 915 may be assigned to a default value, for example, "0000".

The second nibble of byte 6 and byte 7 contain the time_slot 920, which indicates the time slot 215a, 215b, 215c, . . . , 215d assigned to the network node identified by the destination_ID 910 (i.e., the network node that originated the NNDP data packet(s) last received by the access point 120).

Bytes 8 and 9 contain command_parameters 925, which are used in conjunction with the command_type 915 to execute a command issued by the access point 120.

Figure 10:
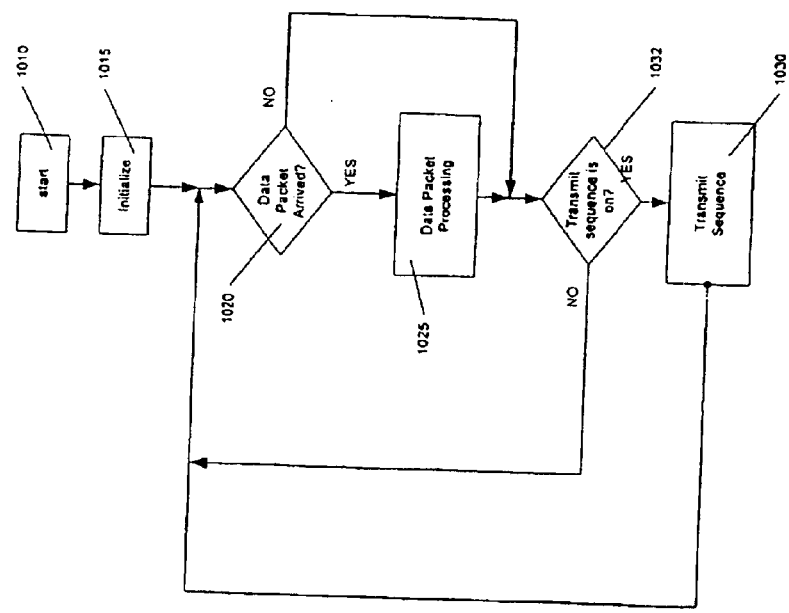
FIG. 10 is a flow diagram of the operational sequence of an exemplary network node according to the present invention.

Referring now to FIG. 10, there is seen a flow diagram of the operational sequence of an exemplary network node, for example, network node 110a, according to the present invention. The operational sequence may be stored, for example, in a memory device, (not shown) or in the microprocessor internal program or data memory, of the network node for execution on microprocessor 310. Or, at least a portion of the operational sequence may be implemented on, for example, a Field Programmable Gate Array (FPGA), an Application Specific Integrated Circuit (ASIC), discrete logic circuits, etc.

The following is a description of exemplary variables, e.g., memory variables, used by the operational sequence shown in FIG. 10. These variables may be stored, for example, in the memory device (not shown) or in the microprocessor internal memory of the network node.

| | |
|---|---|
| MY_SLOT: | This variable stores which of the assignable time slots 215a, 215b, 215c, . . . , 215n the network node is assigned to. A MY_SLOT value of "null" indicates that the network node has not yet received an assigned time slot or has lost its assigned time slot. |
| MY_ID | The unique identifier assigned to the network node. |
| MY_H_LVL: | The hierarchal level assigned to the network node. |
| PARENT_ID: | The unique ID of the neighboring network node to which all subsequent data packets are addressed, until communications fails, i.e., until an acknowledgment NNDP data packet is not received, or until a neighboring network node with a lower hierarchal level is detected. |
| PARENT_H_LVL: | The hierarchal level of the neighboring network node identified by the PARENT_ID. |
| LAST_FROM_ID: | The ID of the neighboring network node that has just transmitted an NNDP data packet to the current network node. This variable is required to help route a subsequent CDP data packet transmitted by the access point to the source network node. |
| LAST_SOURCE: | The ID of the network node that is the source of the NNDP data packet(s) last received by the current network node. |

As shown in FIG. 10, the operational sequence begins at step 1010, after which step 1015 is executed. In step 1015, the network node executes initialization procedures, which may include, for example, preparing communication buffers, updating, timers, and/or enabling a receive mode of the transceiver 315.

In step 1020, it is determined whether a data packet (i.e., NNDP, CDP, or BCDP) has been received by the network node. If so, step 1025 is executed, in which the data packet is processed. After processing the received data packet, or if no data packets have been received, step 1032 is executed, in which it is determined whether the transmit sequence is operational. If so, and if transmission is needed, transmit sequence step 1030 is executed. If not, step 1020 is executed, in which it is checked whether a data packet has arrived.

Figure 11:
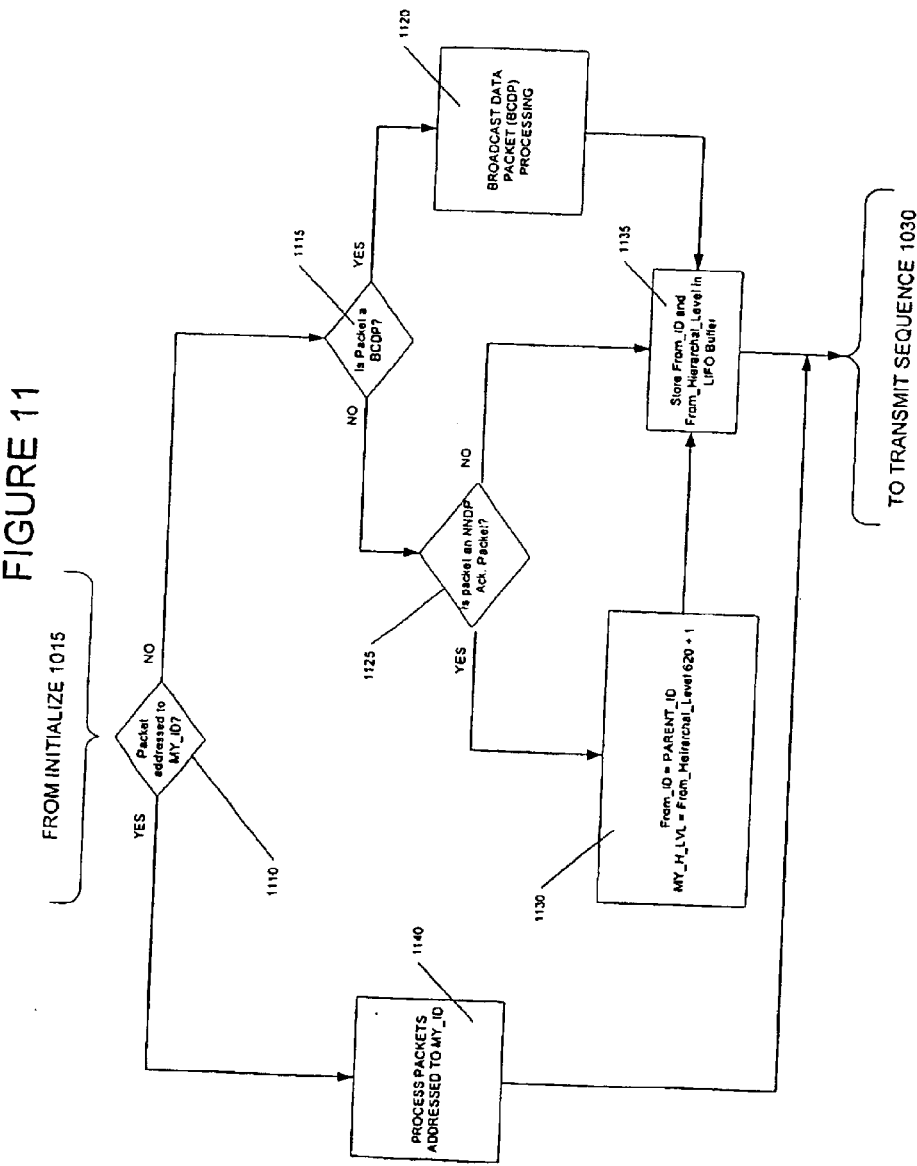
FIG. 11 is a flow diagram of an exemplary data packet processing sequence according to the present invention.

Referring now to FIG. 11, there is seen an exemplary data packet processing sequence 1025 as shown in FIG. 10. The data packet processing sequence 1025 begins by checking whether the to_ID 615 of the received data is addressed to the network node (i.e., whether the network node is the intended destination of the received data packet). If not, the data packet is either a BCDP data packet (i.e., a broadcast data packet, which is not addressed to any individual network node), an NNDP data packet addressed to either another network node or the access point 120, or a CDP data packet addressed to another network node.

If the data packet's to_ID 615 is not addressed to the network node, step 1115 is executed, in which it is determined whether the received data packet is a BCDP data packet. If so, step 1120 is executed, in which processing of the BCDP is performed.

During the BCDP data packet processing step 1120, the network node synchronizes to other network nodes, thereby permitting the network node to determine the start of its respective time slot 215a, 215b, 215c, . . . , 215n. For this purpose, it is determined whether the network node's currently assigned time slot, i.e., MY_SLOT, is set to the "null" time slot. MY_SLOT will be assigned the "null" time slot, for example, upon powering up the network node or, for example, if the network node loses its assigned time slot (e.g., if the access point 120 does not receive NNDP data packet(s) originated by the network node or if the network node does not receive a CDP data packet acknowledging the received NNDP data packet(s) originated by the network node). In this exemplary embodiment according to the present invention, the "null" time slot is time slot "0".

If the network node's time slot (MY_SLOT) is set to the "null" time slot, i.e., the $0^{th}$ time slot, the network node configures itself to transmit during one of the random access time slots 220a, 220b, 220c, . . . , 220n of the random access communications interval 210b. To determine which of the random access time slots 220a, 220b, 220c, . . . , 220n to transmit in, the network node uses the information contained in the BCDP data packet, for example, the synchro_delay 715, the time_slot_length 720, and the total_slots 725. Using this information, the network node may determine its time to transmit, for example, by the following equation:

Time to Transmit (TTT)=synchro_delay 715+(total_slots 725+ random integer)*time_slot_length 720.

The random access time slotted interval may, for example, have a fixed amount of time slots or, alternatively, a certain percentage of the total number of assigned time slots may be assigned to the random access time slotted interval, for example, 10%.

If, however, MY_SLOT is not set to the "null" time slot, i.e., one of the time slots 215a, 215b, 215c, . . . , 215n of the time-slotted communications interval 210a is assigned to the network node, the network node may determine its time to transmit, for example, using the following equation:

Time to Transmit (TTT)=synchro_delay 715+(MY_SLOT*time_ slot_length 720).

After the network node synchronizes, i.e., determines the time to transmit, the synchro_delay 715 of the BCDP data packet is recalculated, and then the modified BCDP data packet is stored in a transmit buffer for subsequent retransmission during the Broadcast interval 210c after a random delay. The random delay is necessary to prevent simultaneous retransmission of the BCDP data packet by those network nodes 110a, 110b, 110c, . . . , 110n receiving the BCDP data packet essentially at the same time. The synchro_delay 715 is recalculated before each retransmission of the BCDP data packet to ensure, or at least makes more probable, that the synchro_delay 715 will expire at the same time for each of the network nodes 110a, 110b, 110c, . . . , 110n. For this purpose, the synchro_delay 715, may be recalculated, for example, according to the following equation:

new synchro_delay 715 = (received synchro_delay 715 − delay between receipt of the *BCDP* data packet and retransmission of the *BCDP* after the random timeout )

If the data packet received is an NNDP data packet transmitted by a neighboring network node, step 1125 is executed, in which it is determined whether the NNDP data packet is an acknowledgment NNDP data packet. A received NNDP data packet is an acknowledgment NNDP data packet if the NNDP data packet is a retransmission of the network node's NNDP data packet by a neighboring network node. For example, referring back to FIG. 4, after network node 410c transmits an NNDP data packet to network node 410b, network node 410b retransmits the NNDP data packet to the access point 420. Network node 410c also receives this retransmission of the NNDP data packet from network node 410b to the access point 420. By receiving the retransmission of the NNDP data packet, network node 410c verifies that network node 410b received the original transmission of the NNDP data packet from network node 410c to network node 410b (i.e., network node 410c verifies the integrity of the transmission chain). That is, with respect to node 410c the NNDP data packet is an acknowledgment or verification data packet. For this purpose, network node 410c checks the from_ID 625 and the main information 630 (i.e., the parameter_number 810, the source_ID 815, and the parameter_value 820) of the NNDP data packet. If the from_ID 625 of the NNDP data packet transmitted by network node 410b is the same as the to_ID 615 of the NNDP data packet transmitted by network node 410c to network node 410b, and the main information 630 of the NNDP data packet transmitted by network node 410b is the same as the main information 630 of the NNDP data packet transmitted by network node 410c to network node 410b, the NNDP data packet is considered an acknowledgment NNDP data packet. Thus, if, for example, network node 410b fails to retransmit the NNDP data packet to the access point 420, for example, due to noise or interference blocking the original transmission of the NNDP data packet from network node 410c to network node 410b, network node 410c may retransmit the NNDP data packet to a different neighboring network node. In this manner, network node 410c may ensure, or at least make it more likely, that its NNDP data packet will eventually reach the access point 420.

Referring back to FIG. 11, if the NNDP data packet is an acknowledgment NNDP data packet, step 1130 is executed, in which the network node stores the from_ID 625 and the from_hierarchal_level 620 of the NNDP data packet as the PARENT_ID and a PARENT_H_LVL, respectively. Then, the network node assigns itself a hierarchal level (i.e., MY_H_LVL) equal to the PARENT_H_LVL+1. In this manner, all subsequent data packets will be addressed to the network node identified by the PARENT_ID, until communications fails, i.e., until an acknowledgment NNDP data packet is not received or until a neighboring network node with a lower hierarchal level is detected (see below).

If it is determined, in step 1125, that the received data packet is not an NNDP acknowledgment data packet, this indicates that the received packet is either a non-acknowledgment type NNDP data packet or a CDP data packet addressed to another network node. The network node ignores these types of packets, with the exception of the processing performed by step 1135.

In step 1135, the LIFO stack is updated if the received data packet has a from_hierarchal_level 620 that is either less than or equal to the hierarchal level of the network node's ID currently stored at the top of the LIFO stack. Effectively, the network node processes data packets not addressed to the network node to ensure that at least one neighboring network node's ID and hierarchal level is stored at the top of the LIFO stack. The LIFO stack, the PARENT_ID, and PARENT_H_LVL comprise the dynamic self-routing protocol.

Figure 12:
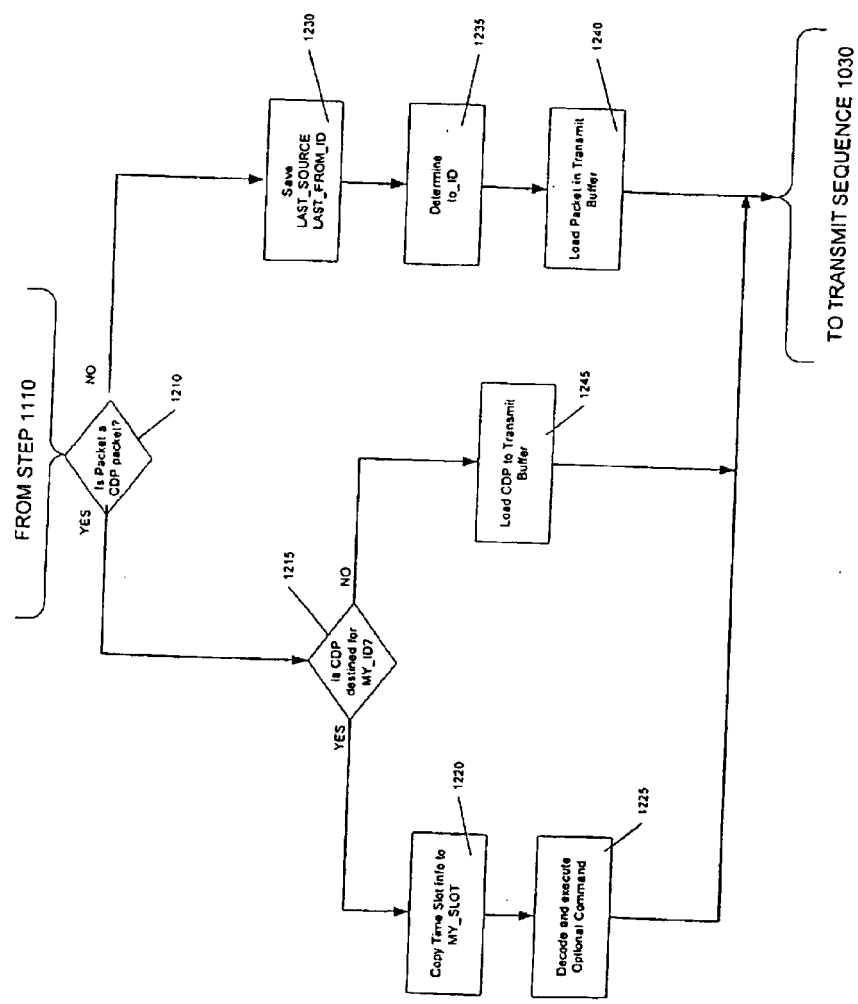
FIG. 12 is a flow diagram of an exemplary sequence for processing data packets addressed to a network node according to the present invention.

If the received data packet is addressed to the network node, step 1140 is executed, in which packets addressed to the network node are processed. Referring now to FIG. 12, there is seen an exemplary sequence 1140 for processing data packets addressed to the network node. If the received data packet is addressed to MY_ID, i.e., the network node, then the received data packet is either a CDP data packet destined for the network node (i.e., the destination_ID 910 is equal to MY_ID), a CDP data packet destined for another network node (i.e., the destination_ID 910 is not equal to MY_ID), or an NNDP data packet transmitted by another network node and destined for the access point 120.

In step 1210, it is determined whether the received data packet is a CDP data packet. If not, step 1230 is executed, in which the network node processes the NNDP data packet transmitted by another network node. As described above, the network node may be the intended destination of the NNDP data packet, if the source network node (i.e., the source of the NNDP data packet) requires intervening transmission to other network nodes to ensure that its respective node information reaches the access point. For example, referring back to FIG. 4, network node 410c must transmit its NNDP data packet(s) to 410b, which then retransmits the NNDP data packet(s) to the access point 420 (i.e., the final destination of the NNDP data packet(s)). Thus, network node 410b is the intended destination of the NNDP data packet transmitted by network node 410c.

Referring back to FIG. 12, the network node copies the from_ID 625 of the NNDP data packet to the internal memory variable LAST_FROM_ID. This step is required because the access point 120 will subsequently transmit a CDP data packet to the source of the NNDP data packet using the same transmission chain, but in reverse order. Thus, when the current network node subsequently receives a CDP data packet destined to the source of the current NNDP data packet, the network node will retransmit the CDP data packet to the network node identified by the LAST_FROM_ID. The network node also copies the destination_ID 910 of the CDP data packet to the variable LAST_SOURCE. In this manner, the network node keeps track of the source of the NNDP data packet.

Then, step 1235 is executed, in which the network node determines which neighboring network node to retransmit the NNDP data packet to by changing the to_ID 615 of the NNDP data packet to either the PARENT_ID or the ID at the top of the LIFO stack. In this manner, the network node will retransmit the NNDP data packet to the neighboring network node identified by the PARENT_ID, unless an acknowledgment NNDP data packet was not detected from the PARENT_ID or if the network node at the top of the LIFO stack has a hierarchal level less than the PARENT_H_LVL, in which case the network node will retransmit the NNDP data packet to the neighboring network node identified by the ID at the top of the LIFO stack. If the network node retransmits the NNDP data packet to the neighboring network node identified by the ID at the top of the LIFO stack, the ID is then removed from the stack. In this manner, the LIFO stack is constantly updated with current routing information.

Then, step 1240 is executed, in which the modified NNDP data packet is loaded in the transmit buffer. Before doing so, however, the network node updates the from_hierarchal_level 620 and the from_ID 625 of the NNDP data packet to indicate the hierarchal level (i.e., MY_H_LVL) and ID (i.e., MY_ID) of the network node, respectively. In this manner, the NNDP is retransmitted to the next neighboring network node in the transmission chain or, alternatively, is transmitted directly to the access point 120. The network node transmits the NNDP directly to the access point 120 if the network node is the last network node in a transmission chain or if the network node is a source network node neighboring the access point 120 (i.e., the network node's hierarchal level permits direct transmission to the access point).

If step 1210 indicates that the received data packet is a CDP data packet, step 1215 is executed, in which it is determined whether the CDP data packet is destined for the current network node (i.e., whether the destination_ID 910 is equal to MY_ID). If so, step 1220 is executed, in which the information contained in the CDP data packet is used to determine the network node's assigned time slot 215a, 215b, 215c, . . . , 215n. Specifically, the network node copies time_slot 930 of the CDP data packet to the variable MY_SLOT. Then, step 1225 is executed, in which it is determined whether the access point 120 requires the network node to execute a command based on the command_type 915 and the command_parameters 925 of the CDP data packet. If so, the network node decodes and executes the command.

If step 1215 indicates that the CDP data packet is not destined for the current network node (i.e., the destination_ID 910 of the CDP data packet is not equal to MY_ID), step 1245 is executed, in which the network node loads the CDP data packet into the transmit buffer for subsequent transmission to the neighboring network node identified by the LAST_FROM_ID. For this purpose, the network node modifies the CDP data packet by changing the to_ID 615 to LAST_FROM_ID, the from_ID 625 to MY_ID, and the from_hierarchal_level 620 to MY_H_LVL. In this manner, the CDP data packet is eventually received by the source of the last transmitted NNDP data packet(s) using the same transmission chain as was used to transmit the NNDP data packet(s) to the access point.

Figure 13:
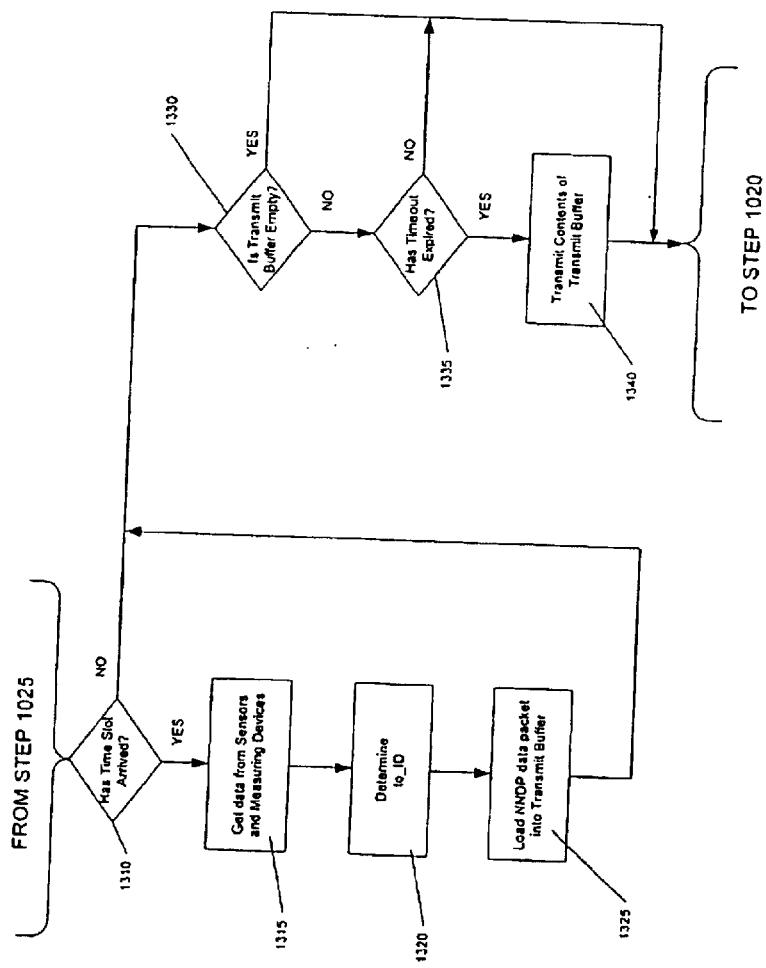
FIG. 13 is a flow diagram of an exemplary transmit sequence according to the present invention.

Referring now to FIG. 13, there is seen an exemplary transmit sequence 1030 according to the present invention. In step 1310, it is determined whether the time to transmit has arrived, i.e., whether the time slot 215a, 215b, 215c, . . . , 215d assigned to the current network node has arrived. If so, step 1315 is executed, in which data from sensors and measuring devices is obtained (e.g., temperature of a room, energy usage, etc.) and packaged into one or more NNDP data packets (e.g., packaged into the parameter_value 820 of one or more NNDP data packets). Then, step 1320 is executed, in which the network node determines which neighboring network node to transmit the newly packaged NNDP data packet(s) to by setting the to_ID 615 of the NNDP data packet to either the PARENT_ID or the ID at the top of the LIFO stack. Specifically, the network node will transmit the NNDP data packet(s) to the neighboring network node identified by the PARENT_ID, unless an acknowledgment NNDP data packet is not detected from the network node identified by the PARENT_ID or if the network node at the top of the LIFO stack has a hierarchal level less than the PARENT_H_LVL. If either of these events occurs, the network node will transmit the NNDP data packet(s) to the neighboring network node identified by the ID at the top of the LIFO stack, after which the ID is removed from the stack. Then, step 1325 is executed, in which the newly packaged NNDP data packet(s) is/are loaded in the transmit buffer.

Steps 1330, 1335, 1340 operate together to transmit information contained in the transmit buffer. First, in step 1330, it is determined whether the transmit buffer is empty. If so, no information is transmitted, and the operational sequence loops back to step 1020. If the transmit buffer is not empty, step 1335 is executed, in which it is determined whether a random timeout has expired. If not, the operational sequence loops back to step 1020. If so, step 1340 is executed, in which the contents of the transmit buffer are transmitted. Then, the operational sequence loops back to step 1020.

The random delay defined by the random timeout only exists when the network node is retransmitting the broadcast message (i.e., BCDP). Thus, when the network node is either originating or retransmitting an NNDP data packet, the random timeout is "0".

Figure 15A:
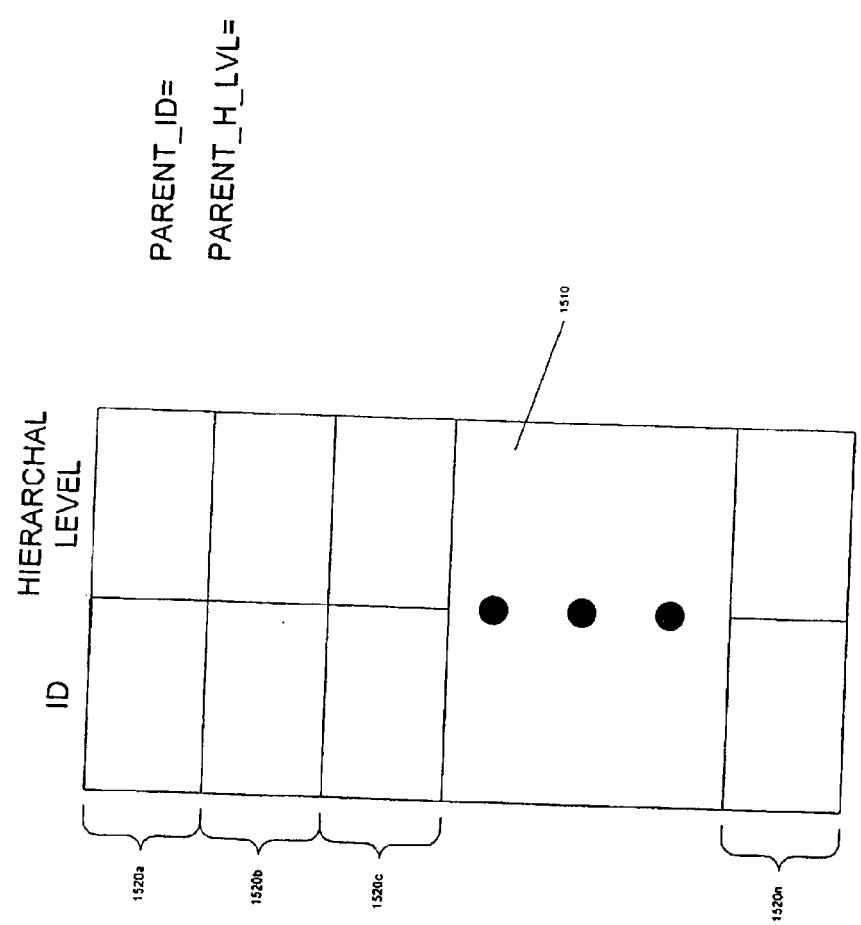

Referring now to FIGS. 15a through 15e, there is seen an exemplary dynamic self-routing protocol according to the present invention. FIG. 15 shows a LIFO stack 1510 and the PARENT_ID memory variable of network node 410c shown in FIG. 4. LIFO stack 1510 includes a plurality of levels 1520a, 1520b, 1520c, . . . , 1520n, each of which is operable to store a network node ID and a network node hierarchal level. As described above with reference to FIG. 4, the access point 420 has a hierarchal level of "1", each of network nodes 410a, 410b has a hierarchal level of "2", network node 410c has a hierarchal level of "3", and network node 410d has a hierarchal level of "4". As shown in FIG. 15a, network node 410c has not yet assigned any of network nodes 410a, 410b, 410d or the access point 420 to either the LIFO stack or the PARENT_ID memory variable.

Figure 15B:
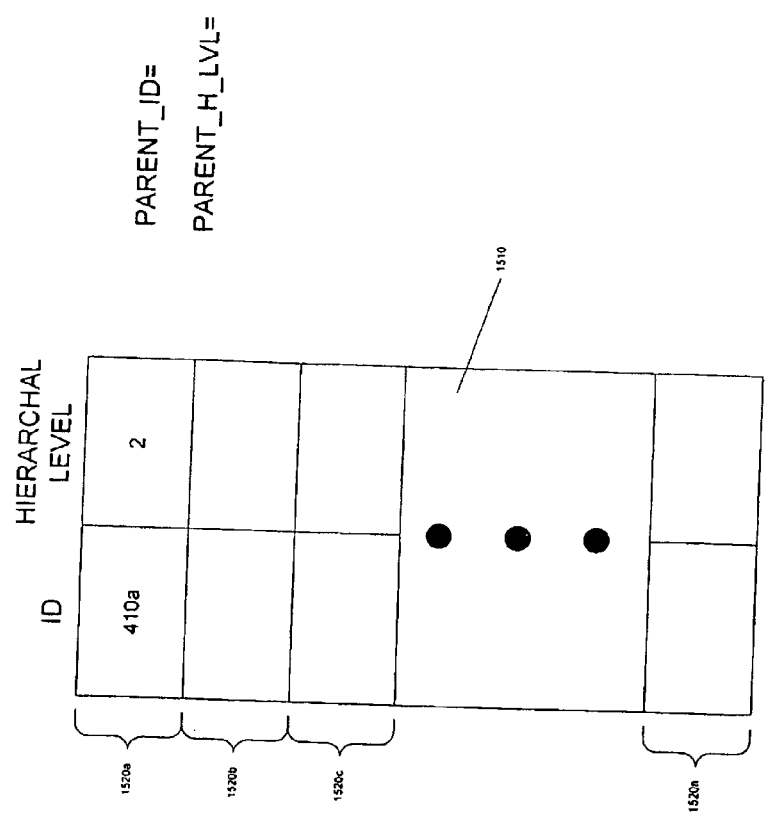

For exemplary purposes only, network node 410a transmits a single NNDP data packet to the access point 420 during its assigned time slot, for example, the $1^{st}$ assigned time slot 215a This NNDP data packet is received by network node 410c, which proceeds to process the NNDP data packet in the manner described above. As shown in FIG. 15b, network node 410c copies the ID and hierarchal level of network node 410a to the top of LIFO stack 1510, since network node 410c has not yet assigned a network node to the LIFO stack 1510.

Figure 15C:
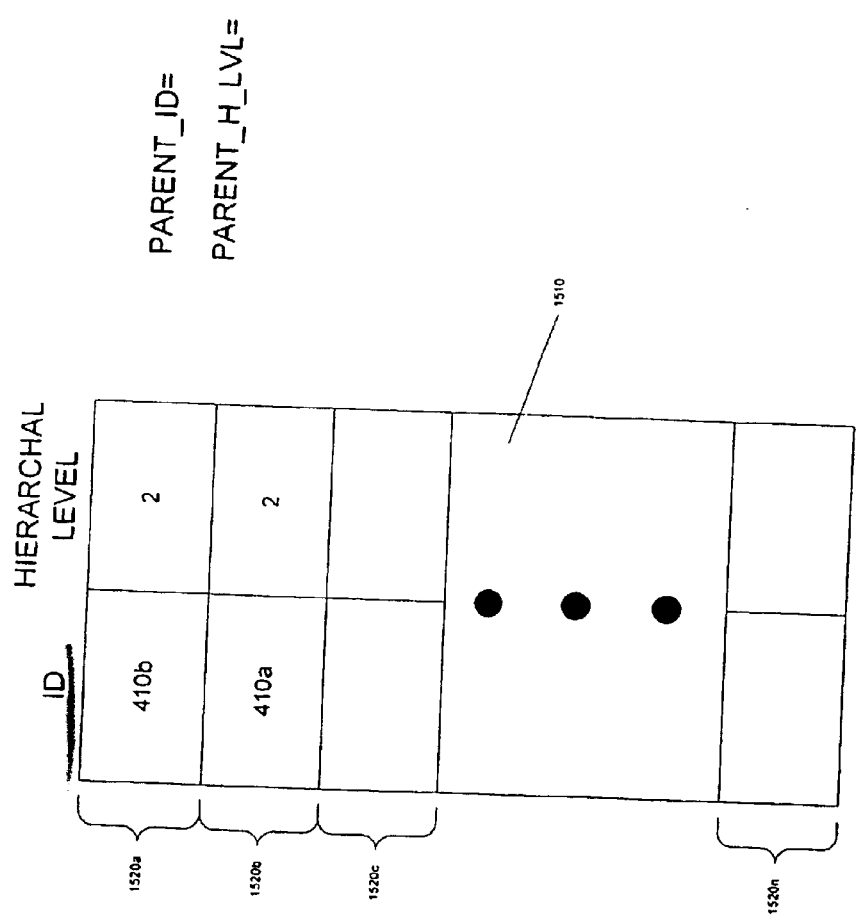

Then, at a subsequent point in time, network node 410b transmits a single NNDP data packet to the access point 420 during its assigned time slot, for example, the 3rd assigned time slot 215c. This NNDP data packet is received by network node 410c, which proceeds to process the NNDP data packet in the manner described above. As shown in FIG. 15c, network node 410c copies the ID of network node 410b to the top of LIFO stack 1510, since network node 410b has a hierarchal level that is less than or equal to the hierarchal level of the ID at the top of the LIFO stack 1510 (i.e., 2 is equal to 2). In doing so, the ID of network node 410a is pushed downward into the second position of the LIFO stack 1510.

Figure 15D:
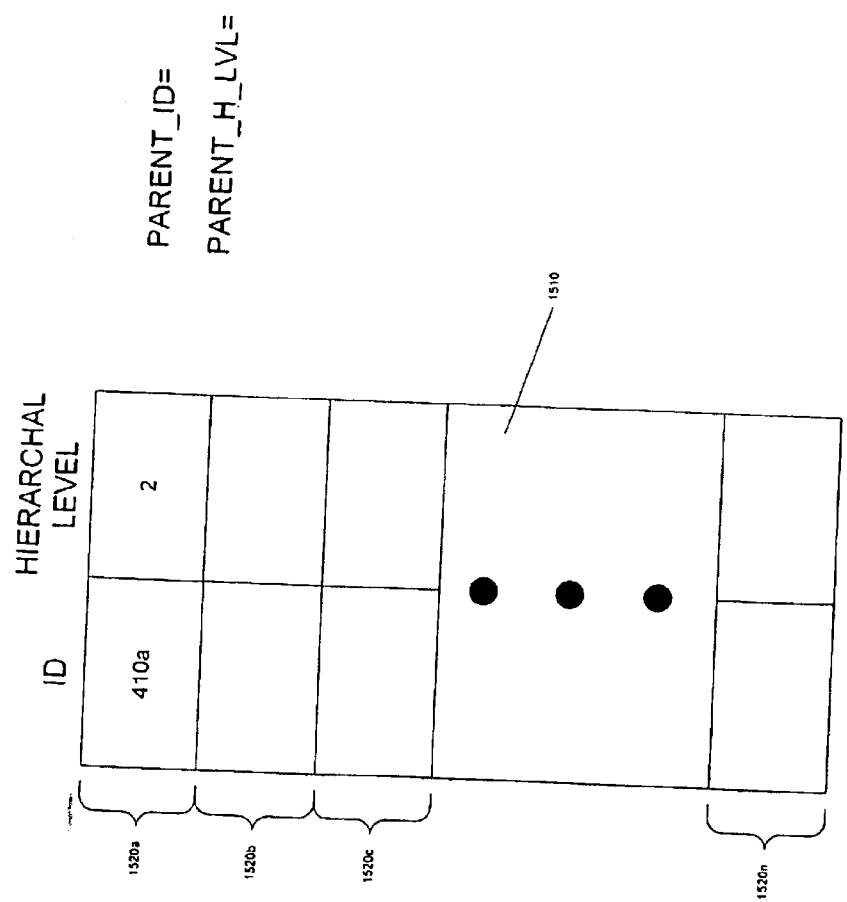

Then, at a subsequent point in time, network node 410c transmits a single NNDP data packet ultimately destined for the access point 420. Since no network node has been assigned to the PARENT_ID, network node 410c transmits the NNDP data packet to the network node at the top of the LIFO stack 1510, i.e., network node 410b. As shown in FIG. 15d, network node 410c then removes network node 410b from the top of the LIFO stack 1510, causing network node 410a to advance to the $1^{st}$ position of the LIFO stack 1510.

After receiving the NNDP data packet, network node 410b retransmits the NNDP data packet to the access point 420. This "retransmission" is received by network node 410c, thereby permitting network node 410c to acknowledge that the NNDP data packet transmitted from network node 410c was actually received by network node 410b. That is, the retransmitted NNDP data packet is also an "acknowledgment" NNDP data packet. At this point, as shown in FIG. 15e, network node 410c copies the ID of network node 410b as the PARENT_ID. In this manner, all subsequent transmissions from network node 410c will be directed to network node 410b, until communications fails, i.e., until an acknowledgment NNDP data packet is not received, or until a neighboring network node with a lower hierarchal level is detected and placed on top of the LIFO stack.

Then, at a subsequent point in time, network node 410d transmits a single NNDP data packet to network node 410c. As described above, network node 410c retransmits this NNDP data packet to network node 410b, since obstacle 430b prevents network node 410d from directly transmitting the NNDP data packet to the access point 420. However, since the hierarchal level of network node 410d is not less than or equal to the hierarchal level of the ID at the top of the LIFO stack 1510 (i.e., 4 is not less than or equal to 2), network node 410c does not copy the ID of network node 410d to the top of the LIFO stack 1510.

Figure 14B:
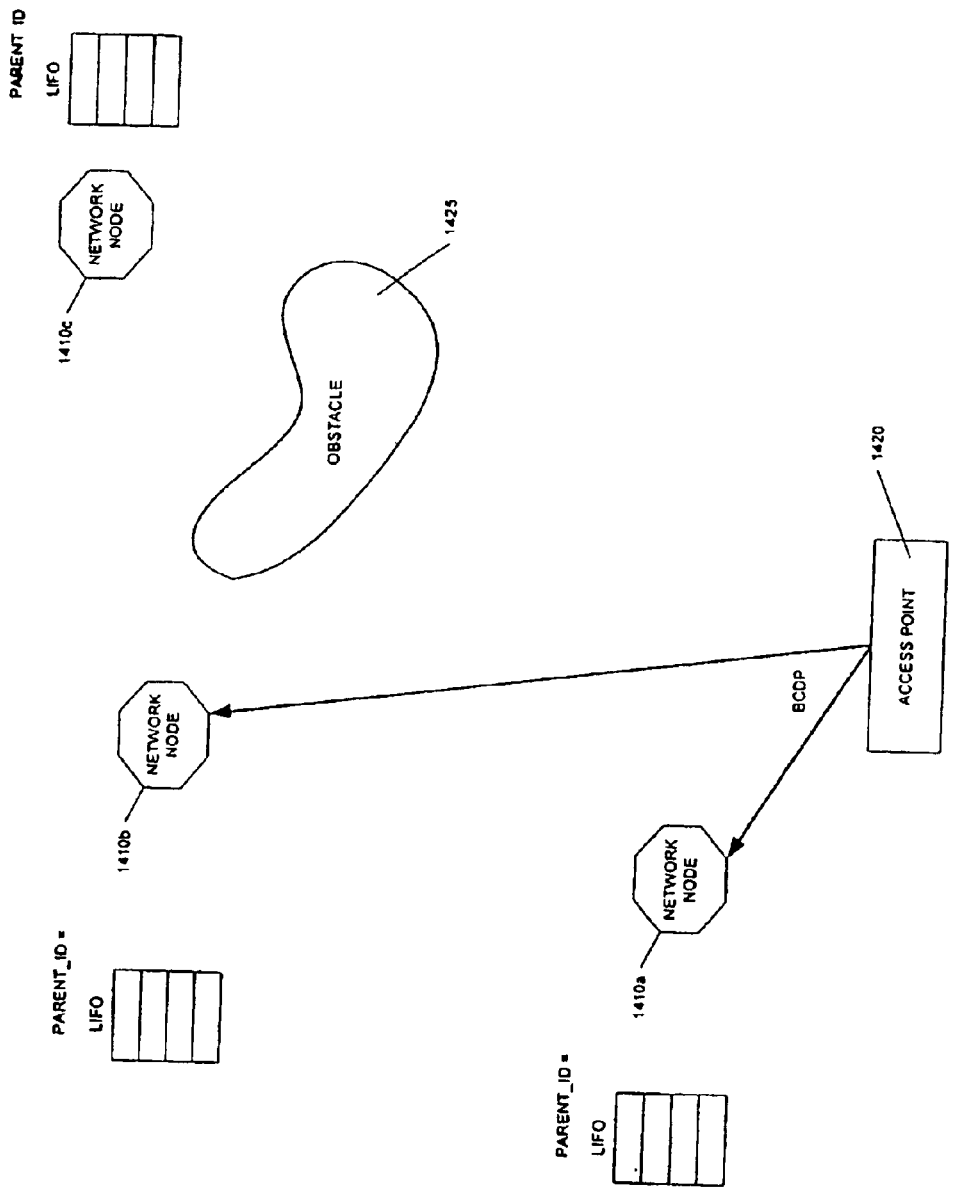

Referring now to FIGS. 14a through 14l, there is seen an exemplary ad hoc wireless network 1400 upon power up. As shown in FIG. 14a, the hoc wireless network 1400 includes network nodes 1410a, 1410b, and 1410c, as well as access point 1420. In this exemplary embodiment, network nodes 1410a, 1410b are capable of directly communicating with the access point 1420. Network node 1410c, however, is prevented from directly communicating with both the access point 1420 and network node 1410a by obstacle 1425. As shown in FIG. 14a, upon power up, none of the network nodes 1410a, 1410b, 1410c has assigned itself a hierarchal level or a PARENT_ID, and none of the network nodes 1410a, 1410b, 1410c has an network node ID at the top of its respective LIFO stack.

In this state, each of the network nodes 1410a, 1410b, 1410c is in a "listening" state, in which it waits for a BCDP data packet to be received.

Referring now to FIG. 14b, the access point 1420 transmits the first BCDP data packet during the broadcast interval 210c. The BCDP data packet is then received by network nodes 1410a, 1410b. Each of network nodes 1410a, 1410b processes the BCDP data packet according to step 1120 of FIG. 11, as described above. In this manner, each of network nodes 1410a, 1410b determines that the BCDP data packet was transmitted by the access point 1420, since the from_ID 625 of the BCDP identifies the access point 1420.

Figure 14C:
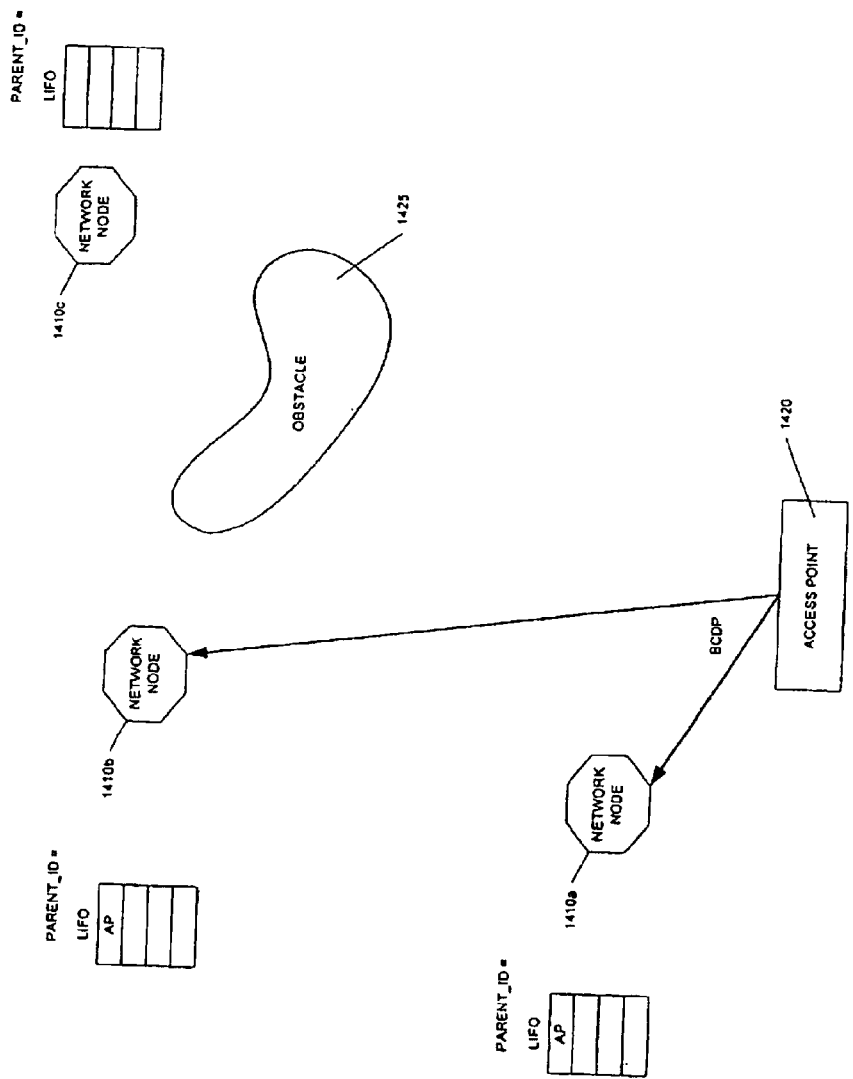

Referring now to FIG. 14c, each of the network nodes 1410a, 1410b copies the from_ID 625 (i.e., the access point) and the from_hierarchal_level 620 (i.e., level "1" for the access point) of the BCDP data packet to the top of the LIFO stack.

Figure 14D:
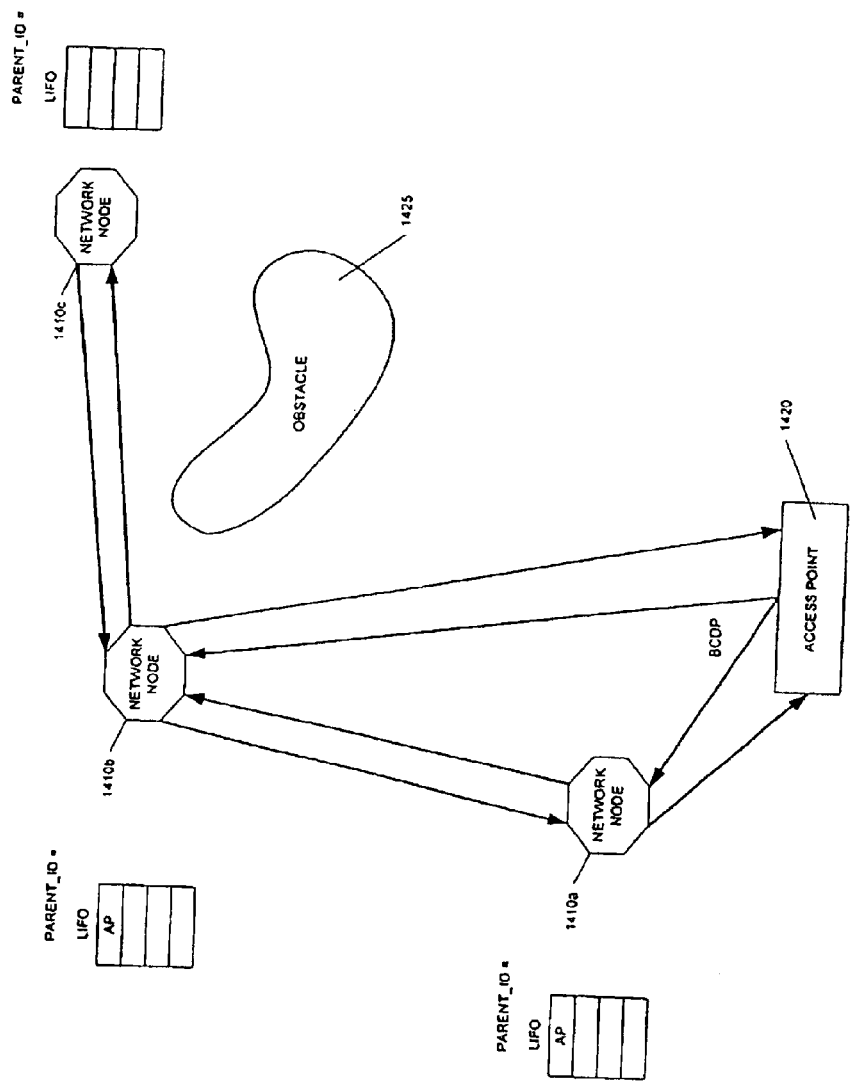

Then, as shown in FIG. 14*d*, each of network nodes 1410*a*, 1410*b* retransmits the BCDP after a random delay, as described above. In this manner, the network node 1410*c* receives the BCDP and then retransmits the BCDP data packet after a random delay. At this point, since each of the network nodes 1410*a*, 1410*b*, 1410*c* has received the BCDP data packet, each of the network nodes is synchronized, i.e., each knows the time of the first assignable time slot 215*a*.

Once synchronized, each of the network nodes 1410*a*, 1410*b* begins to transmit NNDP data packet(s) during one of the random access time slots 220*a*, 220*b*, 220*c*, . . . , 220*d* of the random access communications interval 210*b*, since none of the network nodes 1410*a*, 1410*b* has yet been assigned one of the assignable time slots 215*a*, 215*b*, 215*c*, . . . , 215*n* of the time-slotted communications interval 210*a*. Network node 1410*c*, although synchronized, does not begin to transmit NNDP data packet(s) because it has not yet assigned any of the neighboring network nodes 1410*a*, 1410*b* to the top of its LIFO stack. That is, network node 1410*c* has not yet determined where to transmit subsequent NNDP data packets.

For exemplary purposes only, access point 1420 receives the NNDP data packet(s) of network node 1410*a* first, for example, during the first random access time slot 220*a*. At this point, as shown in FIG. 14*e*, the access point 1420 transmits a CDP data packet to network node 1410*a* during the first random access time slot 220*a*. After the network node 1410*a* receives the CDP data packet, it copies the time_slot information 920 to MY_SLOT In this manner, network node 1410*a* is assigned one of the assignable time slots 215*a*, 215*b*, 215*c*, 215*n*. In this exemplary embodiment, network node 1410*a* is assigned the 1$^{st}$ time slot 215*a*.

The CDP also acts as an "acknowledgment" data packet for all network nodes (i.e., network nodes 1410*a*, 1410*b*) capable of directly communicating with the access point 1420. Thus, as shown in FIG. 14*e*, network node 1410*a* assigns the ID of the access point as the PARENT_ID and assigns the hierarchal level of the access point 1420 (e.g., level "1") to the PARENT_H_LVL and also assigns itself an incremented hierarchal level of the hierarchal level of the access point 1420 (i.e., 1+1="2").

Figure 14F:
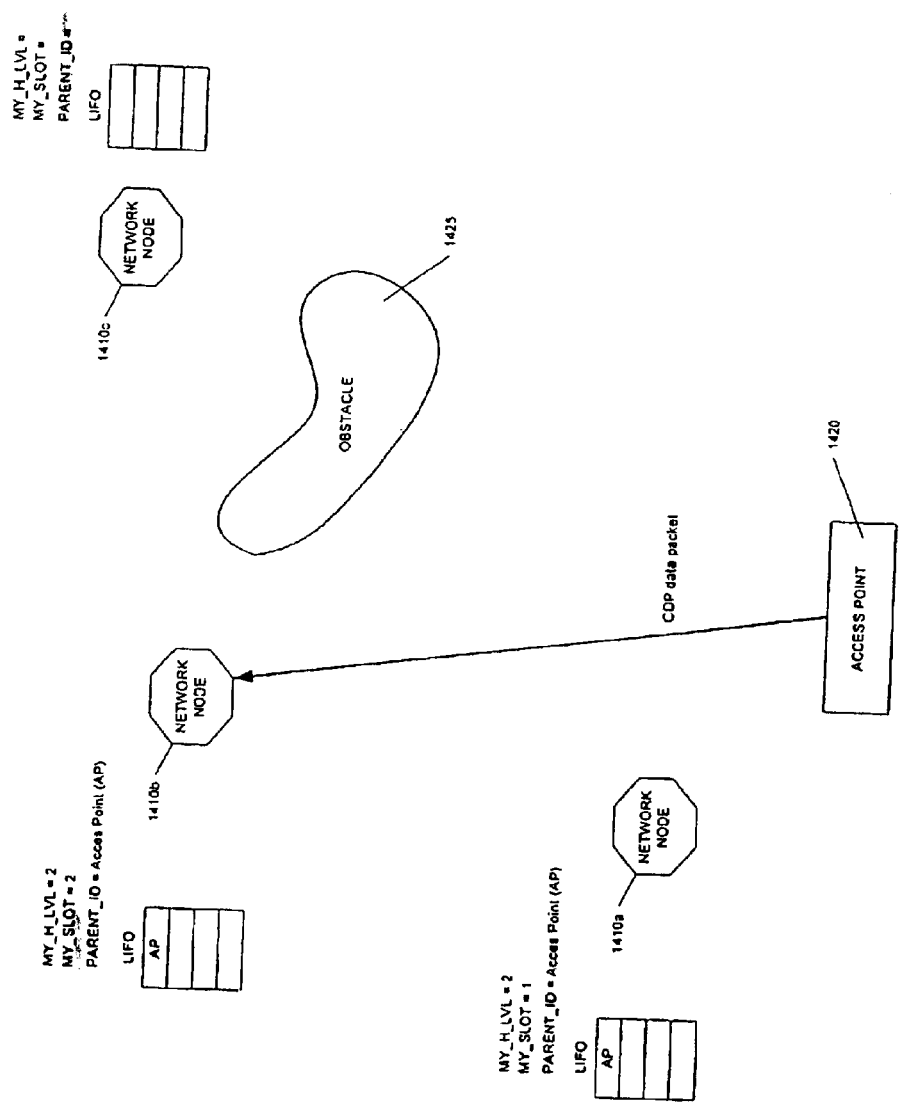

Then, access point 1420 receives the NNDP data packet(s) of network node 1410*b*, for example, during the third random access time slot 220*c*. At this point, as shown in FIG. 14*f*, the access point 1420 transmits a CDP data packet to network node 1410*b* during the third random access time slot 220*c*. After the network node 1410*b* receives the CDP data packet, it copies the time_slot information 920 to MY_SLOT. In this manner, network node 1410*b* is assigned one of the assignable time slots 215*a*, 215*b*, 215*c*, . . . , 215*n*. In this exemplary embodiment, network node 1410*b* is assigned the 2$^{nd}$ time slot 215*b*.

The CDP also acts as an "acknowledgment" data packet for network node 1410*b*. Thus, as shown in FIG. 14*f*, network node 1410*b* assigns the ID of the access point as the PARENT_ID and assigns the hierarchal level of the access point (e.g., level "1") to the PARENT_H_LVL and also assigns itself an incremented hierarchal level of the hierarchal level of the access point 1420 (i.e., 1+1="2").

Figure 14G:
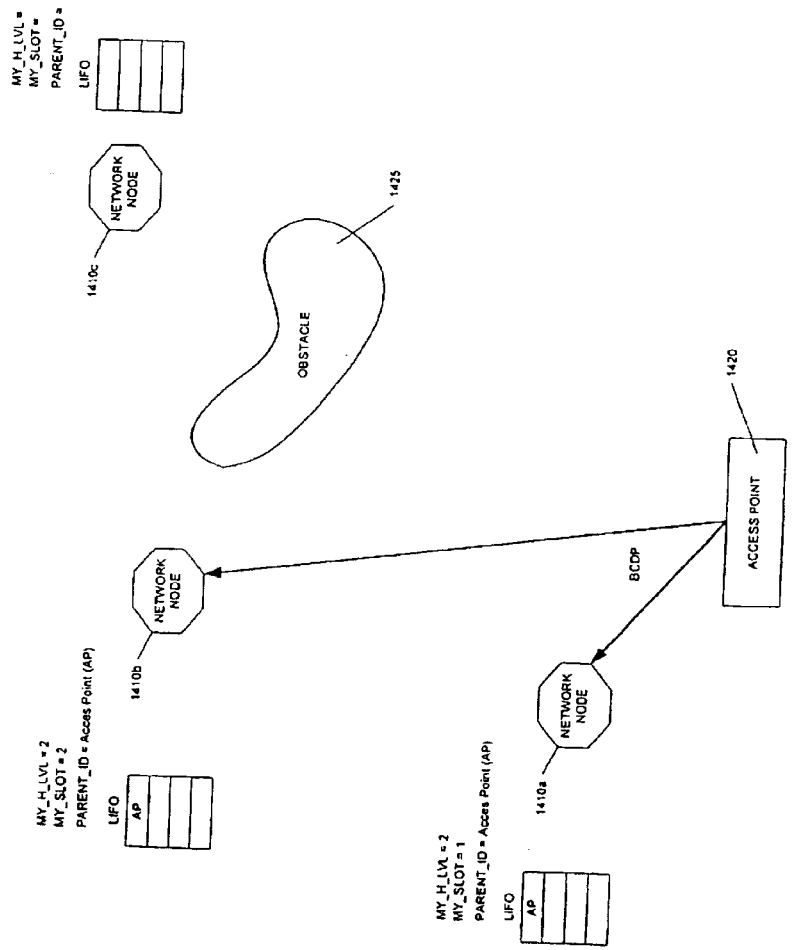
Figure 14H:
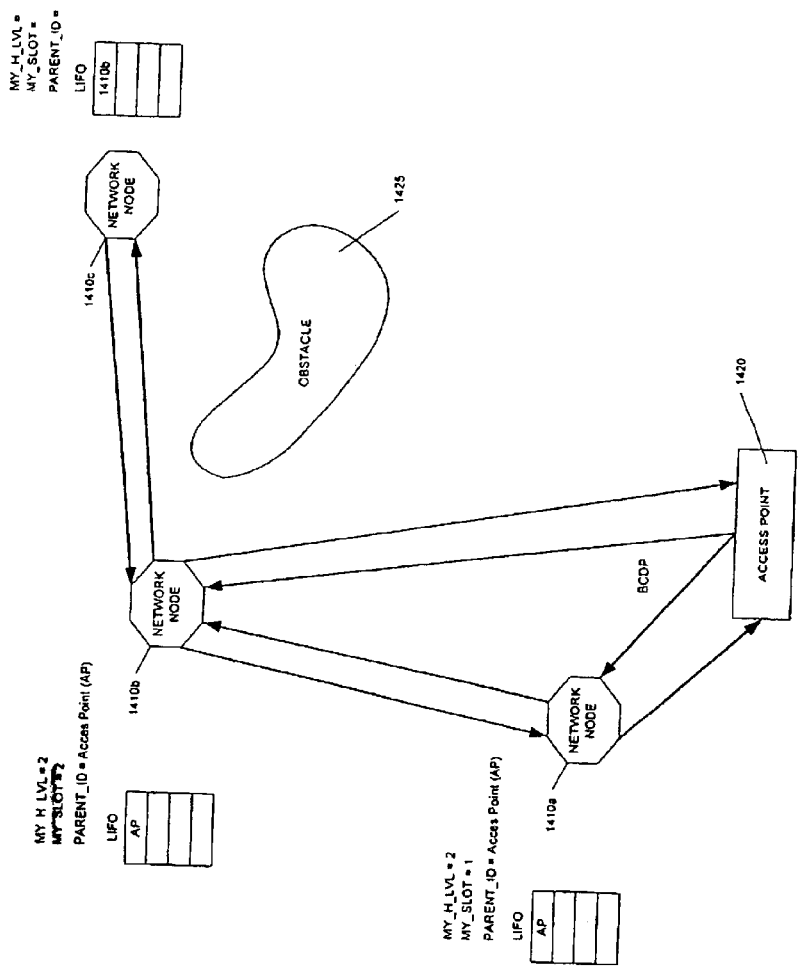

At this point, the first data collection cycle 200 ends and the 2$^{nd}$ data collection cycle begins. As shown in FIG. 14*g*, the access point 1420 transmits a second BCDP data packet during the broadcast interval 210*c*, the BCDP data packet being received by network nodes 1410*a*, 1410*b*. Then, as shown in FIG. 14*h*, network nodes 1410*a*, 1410*b* retransmit the BCDP after a random time delay. However, unlike the first data collection cycle 200, network node 1410*b* retransmits the BCDP with its hierarchal level (i.e., "2") to network node 1410*c*, which then proceeds to copy the from_ID 625 and the from_hierarchal_level 620 of the BCDP data packet to the top of the stack. That is, the network node 1410*c* places the ID and the hierarchal level of network node 1410*b* on top of its stack.

At this point, the network node 1410*c* begins transmitting NNDP data packet(s) during one of the random access time slots 220*a*, 220*b*, 220*c*, . . . , 220*d* of the random access communications interval 210*b*, since network nodes 1410*c* has not yet been assigned one of the assignable time slots 215*a*, 215*b*, 215*c*, . . . , 215*n* of the time-slotted communications interval 210*a*. Network nodes 1410*a*, 1410*b*, however, have already received their respective time slots and, thus, transmit in time slot 215*a*, 215*b* respectively.

Figure 14J:
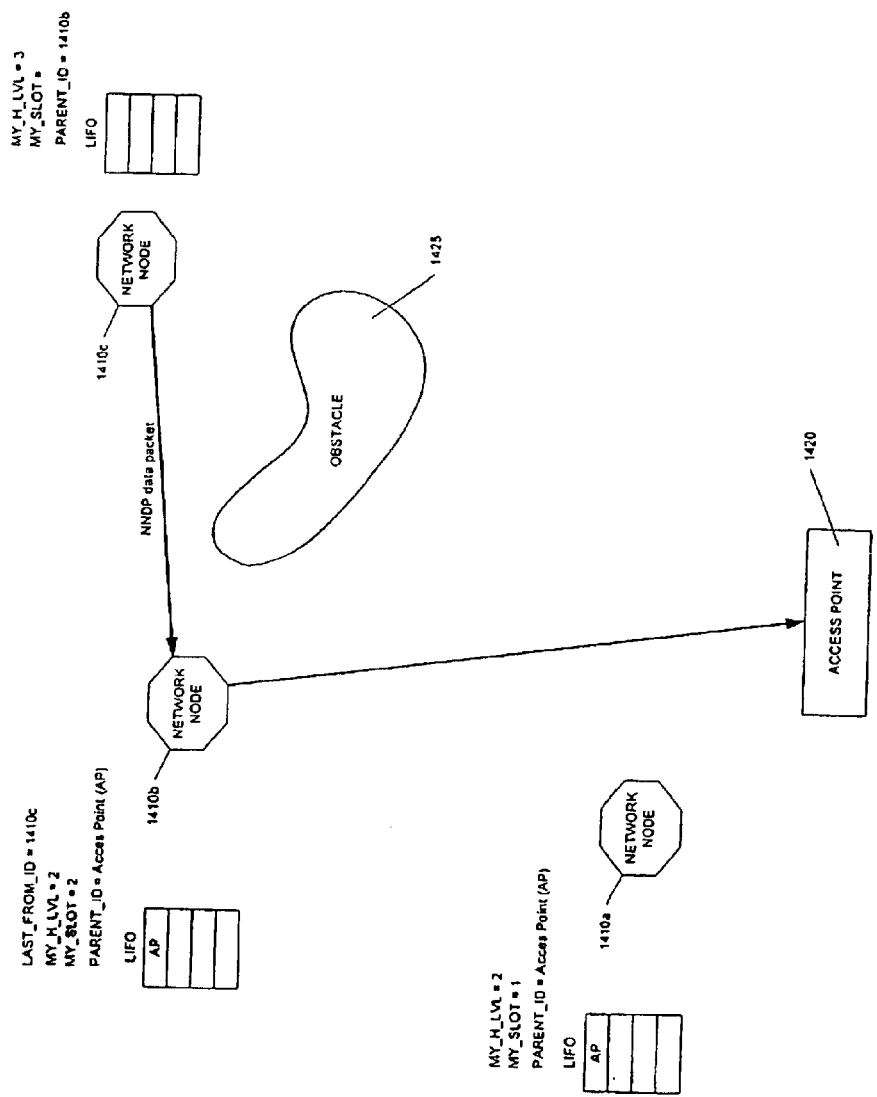
Figure 14K:
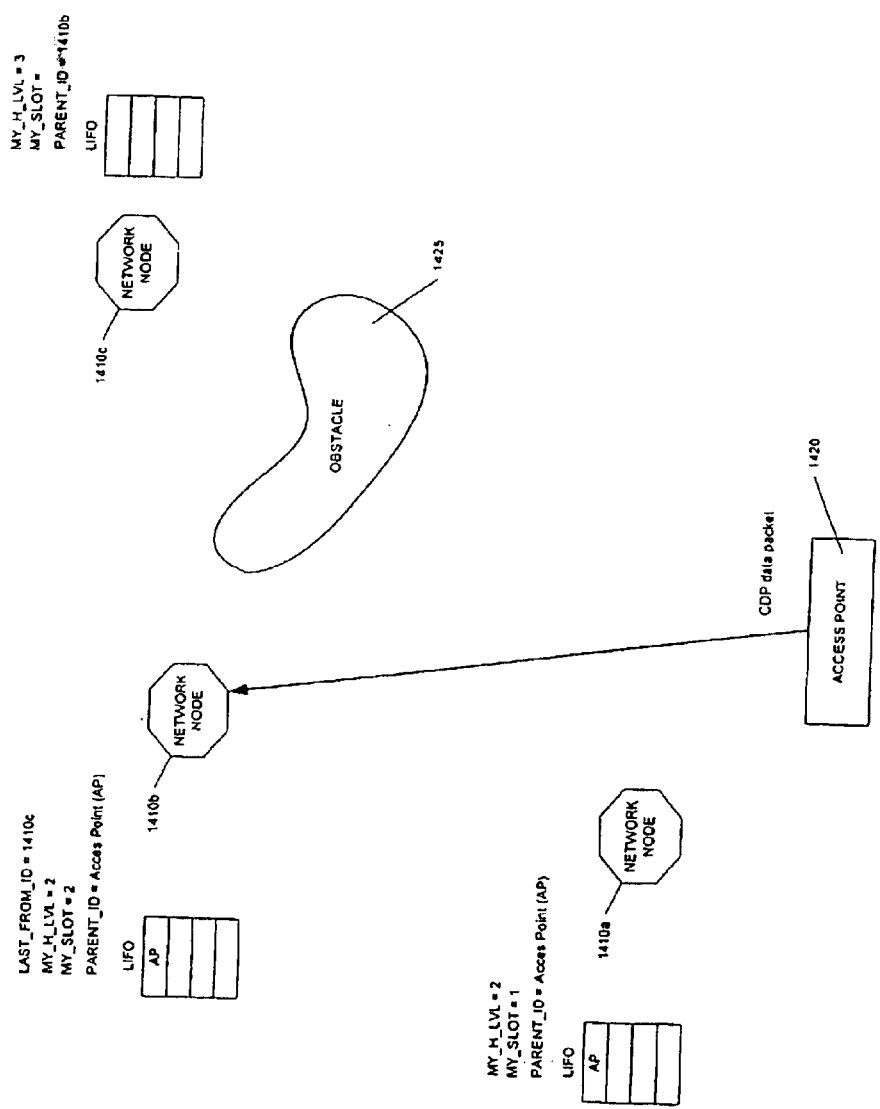
Figure 14I:
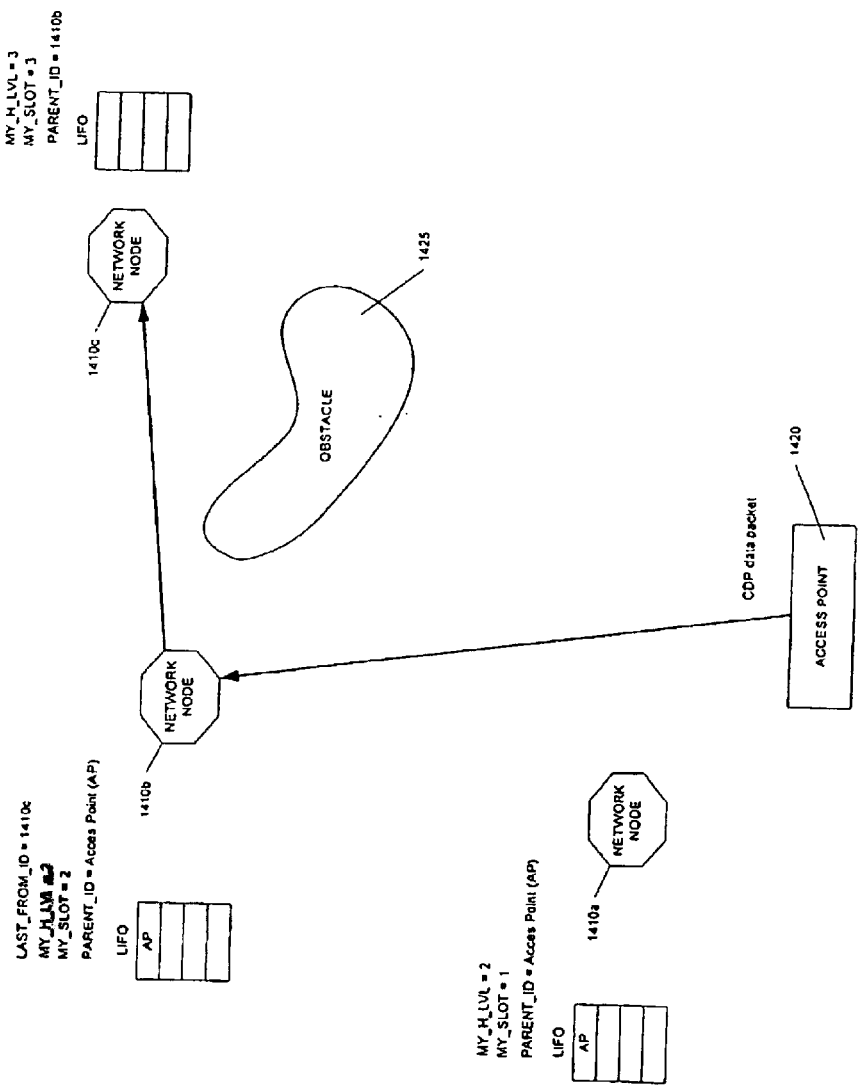

For exemplary purposes only, as shown in FIG. 14*i*, network node 1410*c* transmits a single NNDP data packet during random access time slot 220*a*. Since a PARENT_ID has not yet been assigned, network node 1410*c* transmits the NNDP data packet to the network node whose ID is stored at the top of the stack (i.e., the ID of network node 1410*b*). Then, as shown in FIG. 14*j*, network node 1410*b* retransmits the NNDP data packet to the access point 1420 (NOTE: since network node 1410*c* transmitted the NNDP data packet to the ID at the top of the LIFO stack, this ID has been removed from the stack). At this point, the retransmission of the NNDP by network node 1410*b* to the access point 1420 acts as an acknowledgment to network node 1410*c* that network node 1410*b* has received the NNDP data packet transmitted by network node 1410*c* to network node 1410*b*. Thus, network node 1410*c* assigns network node 1410*b* as the PARENT_ID and assigns itself a hierarchal level (i.e., MY_H_LVL) equal to the hierarchal level of network node 1410*b* incremented by 1 (i.e., 2+1="3"). All subsequent transmissions of NNDP data packets from network node 1410*c* will be transmitted to the network node identified by the PARENT_ID, until communications are lost or until a new network node with a lower hierarchal level is detected and placed on the LIFO stack.

Upon retransmitting the NNDP data packet to the access point 1420, network node 1410*b* saves the from_ID 625 as the LAST_FROM_ID. This step is required so that the network node 1410*b* is able to properly route the subsequent CDP data packet transmitted by the access point 1420 to the network node 1410*c*.

As shown in FIG. 14*k*, the access point 1420 transmits a CDP data packet to acknowledge the receipt of the NNDP data packet transmitted by network node 1410*c*. For this purpose, the access point 1420 uses the same transmission chain as was used to route the NNDP data packet to the access point 1420, except in reverse order. Thus, the access point 1420 transmits the CDP data packet destined for network node 1410*c* to network node 1410*b* (i.e., the to_ID 615 is set to the ID of network node 1410*b* and the destination_ID 910 is set to the ID of network node 1410*c*).

As shown in FIG. 14*l*, after receiving the CDP data packet destined for network node 1410*c*, network node 1410*b* retransmits the CDP data packet to the network node identified by LAST_FROM_ID, i.e., network node 1410*b* retransmits the CDP data packet to network node 1410*c*. After network node 1410*c* receives the CDP data packet, it copies the time_slot information 920 to MY_SLOT. In this manner, network node 1410*c* is assigned one of the assignable time slots 215a, 215b, 215c, . . . , 215n. In this exemplary embodiment, network node 1410a is assigned the 3rd time slot 215c.

In another exemplary embodiment according to the present invention, the source network node retransmits the CDP acknowledgment data packet with a To_ID 615, a From_ID 625, and a Destination_ID 910 equal to MY_ID, i.e., the source network node ID, when the source network node receives the CDP acknowledgment data packet. This retransmission of the CDP acknowledgment data packet may be used by neighboring network nodes, for example, to help determine the first selected neighboring destination for the next communication cycle (as well as the self-assigned hierarchal level). The reliability of the CDP acknowledge message may be increased, for example, by allowing the source network node to retransmit the CDP acknowledge data packet with lower power. In this case, the CDP acknowledge data packet would be received only by neighboring network nodes, the communication links of which permit reliable communication with the source network node.

What is claimed is:

1. A network, comprising:
    at least one access point; and
    a plurality of network nodes arranged in a self-assigned hierarchy and operable to transmit and receive at least one node information message destined for the at least one access point; wherein at least one of the plurality of network nodes transmits the at least one node information message to a first selected one of at least one neighboring destination, the first selected neighboring destination being selected in accordance with a dynamic self-routing protocol, the first selected neighboring destination including one of:
        i) the at least one access point, and
        ii) a first neighboring network node in a next level of the self-assigned hierarchy of network nodes, if the at least one network node is prevented from directly transmitting the node information message to the at least one access point.

2. The network according to claim 1, wherein the at least one network node is a source of at least a portion of the at least one node information message.

3. The network according to claim 2, wherein at least a portion of the at least one node information message is transmitted to the at least one network node by another one of the plurality of network nodes.

4. The network according to claim 3, wherein the at least one network node is operable to transmit and receive the at least one node information message wirelessly using a timely organized communication method.

5. The network according to claim 4, wherein each of the plurality of network nodes is operable to be assigned to one of a plurality of time slots of a time-slotted communications interval.

6. The network according to claim 5, further comprising:
    a device radio communicatively coupled to at least one of the plurality of network nodes, and configured to communicate with the at least one of the plurality of network nodes during a time slot assigned to the at least one of the plurality of network nodes.

7. The network according to claim 6, wherein the device radio is configured to conserve energy.

8. The network according to claim 6, wherein the device radio is configured to enter a sleep mode when not communicating.

9. A network comprising:
    at least one access point; and
    a plurality of network nodes operable to transmit and receive at least one node information message destined for the at least one access point; wherein at least one of the plurality of network nodes transmits the at least one node information message to a first selected one of at least one neighboring destination, the first selected neighboring destination being selected in accordance with a dynamic self-routing protocol, the first selected neighboring destination including one of:
        i) the at least one access point, and
        ii) a first neighboring network node of the plurality of network nodes, if the at least one network node is prevented from directly transmitting the node information message to the at least one access point,
    wherein the at least one access point is assigned one of a plurality of hierarchal levels, and each of the plurality of network nodes is operable to assign itself one of the plurality of hierarchal levels in accordance with a number of intervening transmissions required to ensure that the at least one node information message reaches the at least one access point.

10. The network according to claim 9, wherein the dynamic self-routing protocol selects the first selected neighboring destination in accordance with the hierarchal level assigned to the at least one neighboring destination.

11. The network according to claim 10, wherein the dynamic self-routing protocol selects the first selected neighboring destination such that the hierarchal level assigned to the first selected neighboring destination is lower than the hierarchal level assigned to the at least one network node.

12. The network according to claim 11, wherein each of the plurality of network nodes is further operable to transmit its assigned hierarchal level.

13. The network according to claim 12, wherein the dynamic self-routing protocol receives the hierarchal level assigned to the at least one neighboring destination from a transmission of the hierarchal level assigned to the at least one neighboring destination.

14. The network according to claim 13, wherein the transmission of the hierarchal level assigned to the at least one neighboring destination is transmitted by the at least one neighboring destination.

15. The network according to claim 13, wherein the at least one network node is operable to package its hierarchal level and the at least one node information message into a data packet, the at least one network node being further operable to transmit the data packet.

16. The network according to claim 13, wherein the at least one network node transmits the data packet in accordance with the dynamic self-routing protocol.

17. The network according to claim 9, wherein the at least one access point is operable to transmit at least one acknowledgment message destined for at least one source network node of the plurality of network nodes, the at least one source network node being a source of at least a portion of the at least one node information message.

18. The network according to claim 17, wherein the at least one source network node is configured to retransmit the at least one acknowledgment message.

19. The network according to claim 18, wherein the at least one source network node is configured to retransmit the at least one acknowledgment message at a lower power than a normal operation.

20. The network according to claim 17, wherein each of the plurality of network nodes is operable to receive and transmit the at least one acknowledgment message.

21. The network according to claim 20, wherein the dynamic self-routing protocol selects the first neighboring destination in accordance with the at least one acknowledgment message.

22. The network according to claim 17, wherein the at least one network node is operable to transmit and receive the at least one node information message wirelessly using a timely organized communication method.

23. The network according to claim 22, wherein the at least one network node is operable to transmit and receive the at least one node information message wirelessly using a TDMA communication method.

24. The network according to claim 22, wherein each of the plurality of network nodes is operable to be assigned to one of a plurality of time slots of a time-slotted communications interval.

25. The network according to claim 24, wherein each of the plurality of network nodes is assigned to one of the plurality of time slots in accordance with the at least one acknowledgment message.

26. The network according to claim 17, wherein the dynamic self-routing protocol selects the first selected neighboring destination in accordance with the at least one acknowledgment message.

27. The network according to claim 20, wherein the at least one network node transmits the acknowledgment information to a second selected neighboring destination of the plurality of neighboring destinations, the second selected neighboring destination being selected by the dynamic self-routing protocol, the second neighboring destination including one of:
   i) the at least one source network node, and
   ii) a second neighboring network node of the plurality of network nodes.

28. The network according to claim 27, wherein the dynamic self-routing protocol selects the second selected neighboring destination in accordance with the hierarchal level assigned to the at least one neighboring destination.

29. The network according to claim 28, wherein the dynamic self-routing protocol selects the second selected neighboring destination such that the hierarchal level assigned to the second selected neighboring destination is higher than the hierarchal level assigned to the at least one network node.

30. The network according to claim 29, wherein the at least one network node receives the at least one node information message from the second selected neighboring destination, so that the at least one acknowledgment message is transmitted to the at least one source network node using a same path used by the at least one source network node to transmit the at least one node information message to the at least one access point.

31. A timely organized ad hoc network, comprising:
   at least one access point; and
   a plurality of network nodes arranged in a self-assigned hierarchy and operable to transmit and receive at least one node information message destined for the at least one access point, at least one of the plurality of network nodes including:
      means for selecting a first selected neighboring destination of at least one neighboring destination in accordance with a dynamic self-routing protocol, and
      means for transmitting the at least one node information message to the first selected neighboring destination, the first neighboring destination including one of:
         i) the at least one access point, and
         ii) a first network node in a next level of the self-assigned hierarchy of network nodes, if the at least one network node is prevented from directly transmitting the at least one node information message to the at least one access point.

32. The network according to claim 31, wherein the at least one network node is a source of at least a portion of the at least one node information message.

33. The network according to claim 32, wherein at least a portion of the at least one node information message is transmitted to the at least one network node by another one of the plurality of network nodes.

34. The network according to claim 31, wherein the at least one network node is operable to transmit and receive the at least one node information message wirelessly using a timely organized communication method.

35. The network according to claim 34, wherein each of the plurality of network nodes is operable to be assigned to one of a plurality of time slots of a time-slotted communications interval.

36. A network, comprising:
   at least one access point; and
   a plurality of network nodes arranged in a self-assigned hierarchy, the plurality of network nodes and the at least one access point being operable to transmit and receive at least one data packet, each of the at least one data packet being destined for a respective ultimate destination; wherein at least one of the network nodes and the at least one access point transmits the at least one data packet to a neighboring destination selected in accordance with a dynamic self-routing protocol, the neighboring destination including one of:
      i) the ultimate destination, and
      ii) a first network node in a next level of the self-assigned hierarchy of network nodes, if the at least one network node is prevented from directly transmitting the at least one data packet to the ultimate destination.

37. The network according to claim 36, wherein the at least one data packet includes at least one of:
   i) at least one Broadcast Data Packet,
   ii) at least one Command Data Packet, and
   iii) at least one Network Data Packet.

38. The network according to claim 36, wherein the ultimate destination includes the at least one access point.

39. The network according to claim 36, wherein the ultimate destination includes at least one of the plurality of network nodes.

40. A network node, comprising:
   a microprocessor arrangement;
   a transceiver arrangement communicatively coupled to the microprocessor arrangement; and
   a device arrangement communicatively coupled to the microprocessor arrangement, the device arrangement receiving source node information from at least one of at least one sensor, at least one measuring device, and at least one controlling device; wherein the microprocessor arrangement is configured to transmit the source node information to a first selected neighboring destination of at least one neighboring destination, the microprocessor arrangement transmitting the source node information via the transceiver arrangement, the first selected neighboring destination being selected in accordance with a dynamic self-routing protocol, the first selected neighboring destination including one of:

i) at least one access point, and ii) a first network node in a next level of a self-assigned hierarchy of network nodes, if the microprocessor arrangement is prevented from directly transmitting the source node information to the at least one access point via the transceiver arrangement.

41. The node according to claim 40, wherein the microprocessor arrangement is configured to receive external node information via the transceiver arrangement, the microprocessor arrangement being further configured to transmit the external node information to the first selected neighboring destination via the transceiver arrangement in accordance with the dynamic self-routing protocol.

42. A network node comprising:

a microprocessor arrangement;

a transceiver arrangement communicatively coupled to the microprocessor arrangement; and a device arrangement communicatively coupled to the microprocessor arrangement, the device arrangement receiving source node information from at least one of at least one sensor, at least one measuring device, and at least one controlling device; wherein the microprocessor arrangement is configured to transmit the source node information to a first selected neighboring destination of at least one neighboring destination, the microprocessor arrangement transmitting the source node information via the transceiver arrangement, the first selected neighboring destination being selected in accordance with a dynamic self-routing protocol, the first selected neighboring destination including one of:

i) at least one access point, and ii) a first network node of the plurality of network nodes, if the microprocessor arrangement is prevented from directly transmitting the source node information to the at least one access point via the transceiver arrangement, wherein the microprocessor arrangement is further configured to receive acknowledgment information via the transceiver arrangement, the acknowledgment information being destined for a source network node of the plurality of network nodes, the microprocessor arrangement being further configured to transmit the acknowledgment information to a second selected neighboring destination of the at least one neighboring destination, the microprocessor arrangement transmitting the acknowledgment information via the transceiver arrangement, the second selected neighboring destination being selected in accordance with the dynamic self-routing protocol, the second selected neighboring destination including one of:

i) the source network node, and ii) a second network node of the plurality of network nodes.

43. A method of communicating data between a plurality of network nodes and at least one access point, the method comprising:

providing a network, including the at least one access point and the plurality of network nodes arranged in a self-assigned hierarchy, the plurality of network nodes operable to transmit and receive at least one node information message destined for the at least one access point, at least one of the plurality of network nodes transmitting the at least one node information message to a first selected one of at least one neighboring destination, the first selected neighboring destination being selected in accordance with a dynamic self-routing protocol, the first selected neighboring destination including one of:

i) the at least one access point, and ii) a first neighboring network node in a next level of the self-assigned hierarchy of network nodes, if the at least one network node is prevented from directly transmitting the node information message to the at least one access point.

* * * * *